US010337705B2

(12) United States Patent
Rolf

(10) Patent No.: US 10,337,705 B2
(45) Date of Patent: Jul. 2, 2019

(54) LAMP FOR SUPPORTING A SPEAKER ASSEMBLY OR INDUCTIVE CHARGER

(71) Applicant: glori, llc, Overland Park, KS (US)

(72) Inventor: Devon A. Rolf, Overland Park, KS (US)

(73) Assignee: glori, llc, Overland Park, KS (US)

(*) Notice: Subject to any disclaimer, the term of this patent is extended or adjusted under 35 U.S.C. 154(b) by 0 days.

(21) Appl. No.: 16/001,408

(22) Filed: Jun. 6, 2018

(65) Prior Publication Data

US 2018/0356078 A1   Dec. 13, 2018

Related U.S. Application Data

(60) Provisional application No. 62/577,963, filed on Oct. 27, 2017, provisional application No. 62/541,996, (Continued)

(51) Int. Cl.
| | |
|---|---|
| *F21S 6/00* | (2006.01) |
| *F21V 21/06* | (2006.01) |
| *F21V 21/10* | (2006.01) |
| *F21V 23/00* | (2015.01) |
| *F21V 21/108* | (2006.01) |
| *H04R 1/02* | (2006.01) |

(Continued)

(52) U.S. Cl.
CPC ............. *F21V 21/06* (2013.01); *F21S 6/002* (2013.01); *F21S 6/005* (2013.01); *F21V 21/10* (2013.01); *F21V 21/108* (2013.01); *F21V 23/001* (2013.01); *F21V 33/0056* (2013.01); *H04R 1/028* (2013.01); *H01R 25/006* (2013.01); *H02J 7/025* (2013.01); *H04R 2420/07* (2013.01)

(58) Field of Classification Search
CPC ........ F21S 6/00–6/008; F21V 23/001–23/002; F21V 21/10; F21V 21/108; F21V 33/0052–33/0056
See application file for complete search history.

(56) References Cited

U.S. PATENT DOCUMENTS

| 2,413,700 A | 1/1947 | Farrell |
|---|---|---|
| 2,924,661 A | 2/1960 | Messeas, Jr. |

(Continued)

FOREIGN PATENT DOCUMENTS

| CN | 2878928 Y | * | 3/2007 |
|---|---|---|---|
| CN | 1991248 A | * | 7/2007 |

*Primary Examiner* — Mariceli Santiago
(74) *Attorney, Agent, or Firm* — Erikson Kernell IP, LLC; Kent R. Erikson

(57) ABSTRACT

A table or floor lamp has a base, for supporting an electronic device such as a wireless speaker assembly or inductive charging plate, that defines a cavity into which all or at least a substantial portion of the power chord of the electronic device is concealed. The lamp includes and power chord for plugging into a source of power and the base includes an electrical outlet for receiving a plug of a power chord of a wireless electronic device such as a speaker assembly or inductive charging pad. The base may include a pedestal on which the electronic device sits with a post beneath the pedestal around which the cord of the electronic device is wrapped and a gap between the outer periphery of the pedestal and the top of the base through which the cord is wrapped. The base may include an inductive charger for charging a mobile device.

23 Claims, 30 Drawing Sheets

Related U.S. Application Data filed on Aug. 7, 2017, provisional application No. 62/516,422, filed on Jun. 7, 2017.

(51) Int. Cl.
*F21V 33/00* (2006.01)
*H02J 7/02* (2016.01)
*H01R 25/00* (2006.01)

(56) References Cited

U.S. PATENT DOCUMENTS

| | | | |
|---|---|---|---|
| D249,250 S | 9/1978 | Peirish, Jr. | |
| D254,603 S | 4/1980 | Gosswiller | |
| D254,604 S | 4/1980 | Gosswiller | |
| 4,334,211 A | 6/1982 | McConnell et al. | |
| D274,056 S | 5/1984 | Myer | |
| D280,978 S | 10/1985 | Gosswiller | |
| D286,756 S | 11/1986 | Menke et al. | |
| D291,870 S | 9/1987 | Urbanski et al. | |
| D293,090 S | 12/1987 | Garnerone | |
| D294,870 S | 3/1988 | Hsu | |
| 4,817,163 A | 3/1989 | Stastny | |
| 4,875,143 A | 10/1989 | Fernandez | |
| D332,838 S | 1/1993 | Lu | |
| 5,390,257 A | 2/1995 | Oslac et al. | |
| 5,519,178 A | 5/1996 | Ritto et al. | |
| 5,847,922 A | 12/1998 | Smith et al. | |
| 5,916,405 A | 6/1999 | Ritto et al. | |
| 5,980,057 A | 11/1999 | Christie | |
| 5,991,646 A | 11/1999 | Frank et al. | |
| 5,995,634 A | 11/1999 | Zwolski | |
| 6,000,493 A | 12/1999 | Chen | |
| 6,158,869 A | 12/2000 | Barnes, Jr. | |
| 6,206,999 B1 | 3/2001 | Ritto et al. | |
| D445,516 S | 7/2001 | Watanabe et al. | |
| 6,580,361 B2 | 6/2003 | Bucher | |
| D478,941 S | 8/2003 | Hussaini et al. | |
| 6,711,275 B2 | 3/2004 | Damerow et al. | |
| 6,913,110 B1 | 7/2005 | Ritto | |
| D537,436 S | 2/2007 | Lye | |
| D542,279 S | 5/2007 | Chan | |
| 7,299,892 B2 | 11/2007 | Radu et al. | |
| 7,337,874 B1 | 3/2008 | Ritto | |
| D568,867 S | 5/2008 | Parikh | |
| D570,847 S | 6/2008 | Chern | |
| D592,180 S | 5/2009 | Davis et al. | |
| 7,535,341 B2 | 5/2009 | Haase | |
| D601,544 S | 10/2009 | Moeggenberg et al. | |
| 7,606,379 B2 | 10/2009 | Ivey et al. | |
| 7,661,508 B1 | 2/2010 | Ritto | |
| 7,782,012 B2 | 8/2010 | Jo | |
| 7,784,957 B2 | 8/2010 | Wright | |
| 7,878,673 B2 | 2/2011 | Kempkey et al. | |
| D634,870 S | 3/2011 | Shen et al. | |
| D641,338 S | 7/2011 | Chen | |
| D644,350 S | 8/2011 | Hasse | |
| D644,351 S | 8/2011 | Hasse | |
| 8,010,367 B2 | 8/2011 | Muschett et al. | |
| 8,013,719 B2 | 9/2011 | Haase | |
| 8,027,498 B2 | 9/2011 | Tsai et al. | |
| 8,083,024 B1 | 12/2011 | Ritto | |
| 8,284,978 B1 | 10/2012 | Strauser | |
| 8,550,912 B2 | 10/2013 | Lanning et al. | |
| D697,898 S | 1/2014 | Park | |
| 8,690,686 B2 | 4/2014 | Ishikawa et al. | |
| D725,083 S | 3/2015 | Lau et al. | |
| D729,763 S | 5/2015 | Ono | |
| D729,777 S | 5/2015 | Ono | |
| 9,036,858 B1 | 5/2015 | Reeves | |
| 9,039,529 B2 | 5/2015 | Lanning et al. | |
| 9,115,886 B2 | 8/2015 | Lam et al. | |
| D741,209 S | 10/2015 | Nishigaki | |
| D741,296 S | 10/2015 | Park et al. | |
| D742,269 S | 11/2015 | Stein et al. | |
| D742,270 S | 11/2015 | Stein et al. | |
| D748,598 S | 2/2016 | Stein et al. | |
| 2002/0080011 A1 | 6/2002 | Bucher | |
| 2003/0118206 A1 | 6/2003 | Damerow et al. | |
| 2003/0235320 A1 | 12/2003 | Hirschhorn | |
| 2004/0175014 A1 | 9/2004 | Liu | |
| 2006/0060415 A1 | 3/2006 | Radu et al. | |
| 2006/0185930 A1 | 8/2006 | Shu | |
| 2006/0209530 A1* | 9/2006 | Schaak | F21S 6/003 362/86 |
| 2007/0047218 A1* | 3/2007 | Hsieh | A61L 9/22 362/92 |
| 2007/0064433 A1 | 3/2007 | Wright | |
| 2007/0097689 A1* | 5/2007 | Barausky | F21S 6/003 362/287 |
| 2007/0222631 A1 | 9/2007 | Haase | |
| 2007/0223723 A1 | 9/2007 | Haase | |
| 2007/0269074 A1 | 11/2007 | Broadley et al. | |
| 2008/0154599 A1 | 6/2008 | Muschett et al. | |
| 2008/0199036 A1 | 8/2008 | Tsai et al. | |
| 2008/0298045 A1 | 12/2008 | Wright | |
| 2009/0067663 A1 | 3/2009 | Ivey et al. | |
| 2009/0284974 A1 | 11/2009 | Kempkey et al. | |
| 2009/0310334 A1 | 12/2009 | Lieu et al. | |
| 2011/0080733 A1 | 4/2011 | Wang | |
| 2011/0170704 A1 | 7/2011 | Smith et al. | |
| 2011/0260653 A1 | 10/2011 | Janusonis | |
| 2011/0317861 A1 | 12/2011 | Haase | |
| 2012/0040738 A1 | 2/2012 | Lanning et al. | |
| 2012/0300962 A1 | 11/2012 | Devoto | |
| 2013/0114826 A1 | 5/2013 | Chang | |
| 2013/0117487 A1 | 5/2013 | Leung | |
| 2014/0038693 A1 | 2/2014 | Lanning et al. | |
| 2014/0049939 A1 | 2/2014 | Kuenzler et al. | |
| 2014/0192513 A1 | 7/2014 | Yim et al. | |
| 2014/0285326 A1 | 9/2014 | Luna et al. | |
| 2014/0285999 A1 | 9/2014 | Luna et al. | |
| 2014/0286011 A1 | 9/2014 | Luna et al. | |
| 2014/0327515 A1 | 11/2014 | Luna et al. | |
| 2014/0334653 A1 | 11/2014 | Luna et al. | |
| 2015/0036863 A1 | 2/2015 | Wen et al. | |
| 2015/0124441 A1 | 5/2015 | Lam et al. | |
| 2015/0153037 A1 | 6/2015 | Lee | |
| 2015/0201295 A1 | 7/2015 | Lau et al. | |
| 2015/0212248 A1 | 7/2015 | Yamamoto et al. | |
| 2015/0215691 A1 | 7/2015 | Carlsson et al. | |
| 2015/0237424 A1 | 8/2015 | Wilker | |
| 2015/0264458 A1 | 9/2015 | Rutherford | |
| 2015/0264459 A1 | 9/2015 | Luna et al. | |
| 2016/0023124 A1 | 1/2016 | Wang et al. | |
| 2016/0057521 A1 | 2/2016 | Sun et al. | |

\* cited by examiner

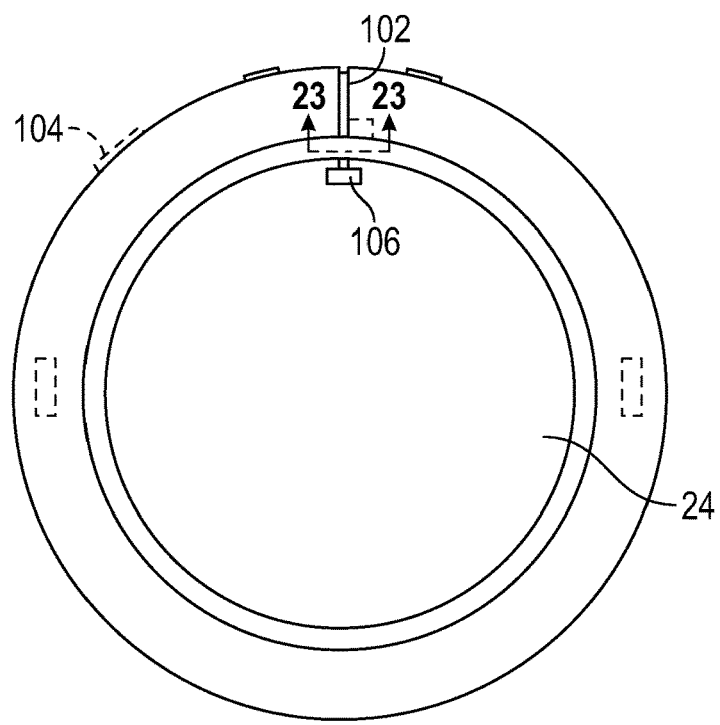
FIG. 24
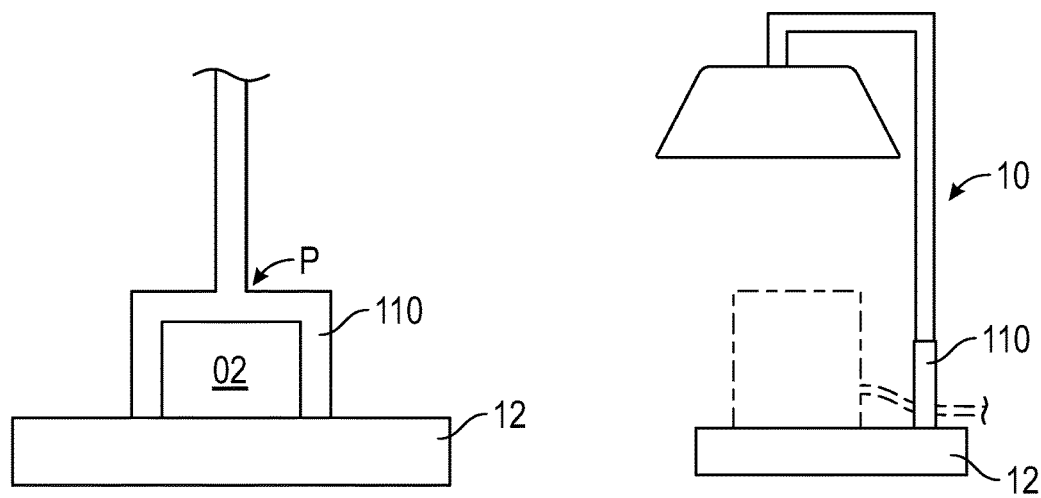
FIG. 25
FIG. 26
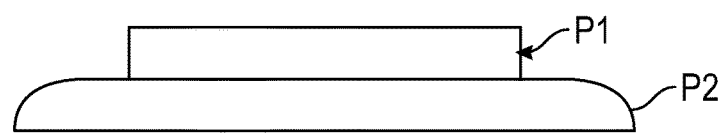
FIG. 27

LAMP FOR SUPPORTING A SPEAKER ASSEMBLY OR INDUCTIVE CHARGER

RELATED APPLICATIONS

This application claims priority benefit with regard to all common subject matter of each of earlier-filed U.S. Provisional Application Ser. No. 62/516,422, entitled Lamp for Supporting a Speaker Assembly, filed Jun. 7, 2017, and U.S. Provisional Application Ser. No. 62/541,996, entitled Lamp for Supporting a Speaker Assembly, filed Aug. 7, 2017, and U.S. Provisional Application Ser. No. 62/577,963, entitled Lamp for Supporting a Speaker Assembly, filed Oct. 27, 2017, each of which is incorporated by reference in its entirety into the present application.

BACKGROUND

Field of the Invention

The present invention relates to a table lamp or floor lamp for supporting a wireless speaker assembly. More specifically, the present invention relates to a table or floor lamp for supporting a wireless speaker assembly in a manner that visually conceals at least a substantial portion of the power cord of the speaker assembly.

Wireless speaker assemblies have become very popular. Current brands include Sonos™, Amazon's Echo™, Google's Home™ speaker, and Apple's recently announced HomePod™ speaker. In addition to playing music and audio received wirelessly, these speaker assemblies have microphones for receiving voice-inputs and have and/or communicate with systems for enabling that voice-input be used for searching and receiving vocal-like responses and controlling other appliances. In other words, such speakers are known as smart speakers having assistant features.

While useful, these speaker assemblies provide another electronic device that must be powered with AC power, resulting in the need to use an outlet and in increased cord clutter. This creates cord clutter and takes-up additional space on surfaces. The present invention provides a solution for these problems and provides a decorative and useful table or floor lamp that provides an outlet for power to and a support for a speaker assembly.

Additionally, mobile devices, such as smartphones, have batteries that require charging, such as with a charging cord that is plugged-in to a power source. More recently, mobile devices are equipped with wireless, inductive charging functionality that enables the mobile device to be set on a charging plate or base that uses wireless inductive charging to charge the battery in the mobile device. While wireless inductive charging is a convenience, the need for an inductive charging plate creates yet another product that has a cord that needs to be plugged-in. This creates cord clutter and takes-up additional space on surfaces. The present invention provides a solution for these problems and provides a decorative and useful table or floor lamp that provides an inductive charger.

SUMMARY OF THE INVENTION(S)

Embodiments of the present invention are a table lamp having a base and lamp structure for supporting a light or lamp socket and lamp shade. The lamp has a power outlet on the base. The lamp has a power cord and a plug for plugging into a wall outlet to provide power to the lamp and the lamp's power outlet.

The base defines a cavity and has an opening at the top of the base that provides access to the cavity. In embodiments, a lower portion of the cavity is larger than an upper portion of the cavity near the opening. In use, a power cord of the speaker assembly is plugged into the outlet on the base of the lamp and all or substantially all of the power chord of the speaker assembly is tucked through the opening into the cavity of the base. The end of the power cord of the speaker assembly, opposite the end having a plug plugged into the outlet of the base, is pulled or kept out of the cavity and plugged into the speaker assembly. The speaker assembly is placed on top of the lamp base in a manner that covers and in some embodiments straddles the opening to the cavity, thus concealing all or most of the speaker assembly's power cord inside the base.

In embodiments of the invention, the base includes a pedestal. In embodiments of the invention, a pedestal extends upwardly from the base. The pedestal has a top piece on which a wireless speaker assembly may be supported and a post under the top piece of the pedestal. In embodiments, the base includes a cavity that is open at the top of the base and the pedestal is positioned within that cavity. In embodiments, the top plane of the pedestal is the same as or substantially similar to the top plane of the base. In embodiments, a peripheral outer dimension of the pedestal top is less than a dimension of the periphery of cavity and the opening to the cavity such that there is space (i.e., a gap) between the top piece of the pedestal and the base. The top piece of the pedestal is supported by the post extending beneath the top piece of the pedestal and a bottom of the base.

A wireless speaker assembly may be positioned on the pedestal. The cord to the wireless speaker is wrapped around the post of the pedestal using the gap between the top piece of the pedestal and the base. One or both of the pedestal top piece and/or the top of the base may include cord recesses or cord clips to enable alignment and placement of the speaker cord.

For example, the speaker assembly cord may be plugged into the outlet in the base and the cord wrapped around the post of the pedestal and then the other end of the speaker assembly cord brought up from underneath the pedestal top through the gap between the pedestal and the base portion and plugged into the speaker assembly. In embodiments, the cord may pass through a cord recess opening/cord clip area and plugged into the speaker assembly. In this way, the speaker assembly cord is largely hidden in the cavity of the base.

In embodiments, the pedestal has a plurality of telescoping posts with one of the posts (such as the post that is just beneath the top piece of the pedestal) including a spool shaped portion. The pedestal may be raised (by extension of the telescoping posts), thereby making the spool shaped portion more accessible. The speaker assembly cord is wrapped around the spool and its respective ends plugged into the outlet in the base and the speaker assembly (which rests on the top of the pedestal). The pedestal may be lowered so that its top is substantially planar flush with the top of the base, thereby lowering the wrapped speaker assembly cord into the cavity within the base. In embodiments with a telescoping post assembly, the top piece of the pedestal may slide into a flush position with the periphery of the cavity opening so that there is not gap between the base and the pedestal. Alternatively, in embodiments having a telescoping post assembly, there may be a gap between the top piece of the pedestal and the base (or at least a portion of the top piece of the pedestal and the base).

In embodiments, the outlet in the base is accessible at an outer periphery of the base. In these embodiments, the speaker power chord is plugged into the outlet and then wrapped beneath the base (or through an opening in the side wall of the base in embodiments) and into the cavity or is strung over the top of the base (and through a cord channel in embodiments) and into the cavity. In embodiments, the end of the speaker power cord opposite the end plugged into the outlet in the base is drawn upwardly out of the cavity through a cut-away portion in the opening to the cavity at the top of the base and plugged into the speaker assembly. In embodiments, the speaker assembly covers all or substantially all of the opening to the cavity except for at least part of the cut-away portion so that the end of the speaker assembly's power cord may be brought out the cavity and plugged into the speaker assembly.

In embodiments, the outlet in the base is accessible at an inner peripheral side wall of the cavity in the base. When there is a pedestal in place in the cavity and opening, in such embodiments, either a gap between the pedestal and the base must be sufficient to enable the plug to pass-through or the pedestal top must have a cut-out through which to pass-through the plug and enable the plug to be plugged-in. In the case of a telescoping pedestal, the pedestal may be raised a sufficient height to create space to enable plugging the plug into the outlet in the cavity of the base. In embodiments, the bottom side of the top of the pedestal has a cavity for receiving the plug when the pedestal is pushed down into its lowered position (i.e., the pedestal bottom side has a space for the plug).

In embodiments, additional lighting features are provided. For example, in addition to a light or lamp bulb socket at a top of the lamp assembly over which a lamp shade is positioned, LEDs (dimmable and separately controllable from the main lamp/light) may be placed in the base to emit light from a bottom of a base (which may be raised by feet or feet-portions) or to emit light from one or more of a front, side, and/or rear of a frame or light-supporting structure of the lamp, and/or to emit light from a periphery of the pedestal. In embodiments, one or both of the top of the base and the top of the pedestal or clear or translucent (such as a diffuser) and LEDs may emit light through it. In embodiments, the LEDs and lamp are controllable by a mobile application.

Additionally, the present invention similarly enables support and cord retention of a separately built wireless inductive charger for charging a mobile device that is equipped with wireless charging functionality. Such chargers, often called charging plates, bases, or pads, have become popular as mobile devices have recently become equipped with wireless inductive charging functionality. Wireless inductive charging pads have a cord for plugging into an outlet and inductive charging coils which generate a field that is transmitted to a receiver in the mobile device. In embodiments, the inductive charging pad, such as for example Belkin™ Boost Up Wireless Charging Pad by Belkin, sits over the opening in the base. In embodiments, such as those in which the charging pad has a sloped outer side wall, the charging pad nests down in the opening in the base of the lamp because the opening is smaller than the top periphery of the charging plate but is smaller than the bottom periphery of the charging plate. In other embodiments, the charging pad fits snugly at least part way into the opening and a vertical peripheral side wall of the charging pad is snugly received with the opening, which may include a ledge on which the outer periphery of the bottom of the charging pad rests.

In embodiments, the invention relates to a table lamp or floor lamp having a base that incorporates an inductive charging plate for charging mobile devices. In particular, an inductive charging plate is electrically connected to the power chord of the lamp such that when the lamp is plugged-in to a power source the charging plate has access to power. The inductive charging plate may have its own on/off power button. The inductive charging plate provides an upper surface on the base of the lamp on which a mobile device that is equipped for wireless inductive charging may be placed for charging the mobile device. The wireless inductive charger may have a built-in timer that turns the charger off after determined amount of time to prevent overcharging the mobile device. In embodiments, the inductive charger is incorporated into a pedestal having a post and a pedestal top. The pedestal top has a top surface on which a mobile device may be set for wireless inductive charging of the mobile device.

BRIEF DESCRIPTION OF THE DRAWINGS

FIG. 24 is a top plan view of an embodiment of a base of the invention;

FIGS. 25 and 26 illustrate embodiments of a table or floor lamp of the invention;

FIG. 27 illustrates an embodiment of a base or base portion of the table or floor lamp of the invention;

DETAILED DESCRIPTION

Figure 1:
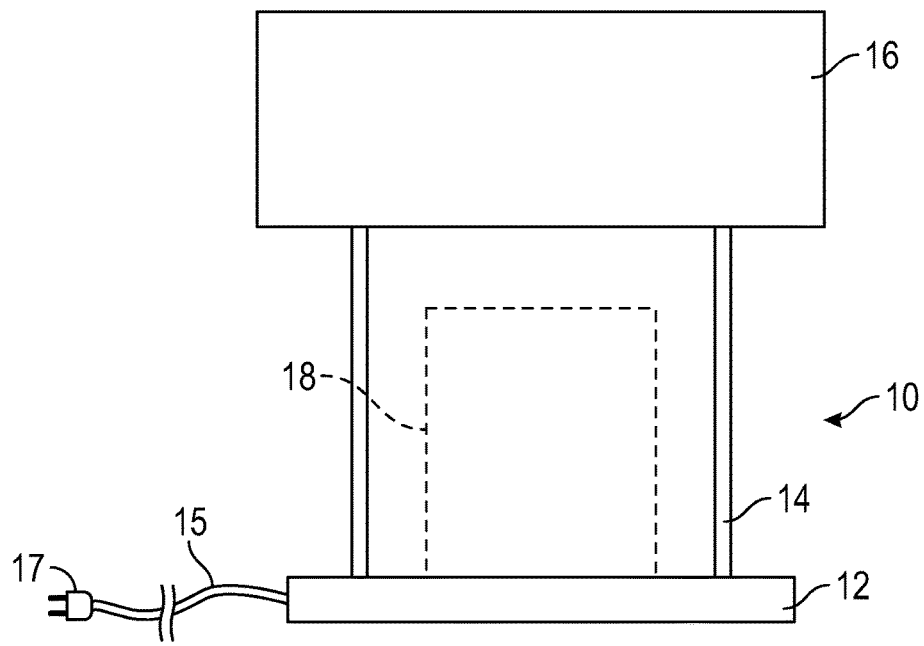
FIG. 1 is a side elevational view of a table or floor lamp having a speaker assembly (shown in dashed lines) sitting on the base (i.e., a pedestal portion of the base)

With reference initially to FIG. 1, a lamp of the present invention is denoted generally by reference numeral 10. Lamp 10 has a base 12, posts 14, a lamp shade 16, a power cord 15 and a plug 17. One or more lights (such as Light Emitting Diodes (LEDs)), light bulbs, and/or lamp sockets are located within the shade in conventional fashion. A wireless speaker assembly and, in particular, the outer periphery of a housing of a wireless speaker assembly, is illustrated in dashed lines by reference numeral 18. Wireless speaker assembly 18 has a power cord (not shown in FIG. 1) that has a plug at one end for plugging in to a power source and a plug or receptacle at the other end for plugging in to the speaker assembly.

Figure 2:
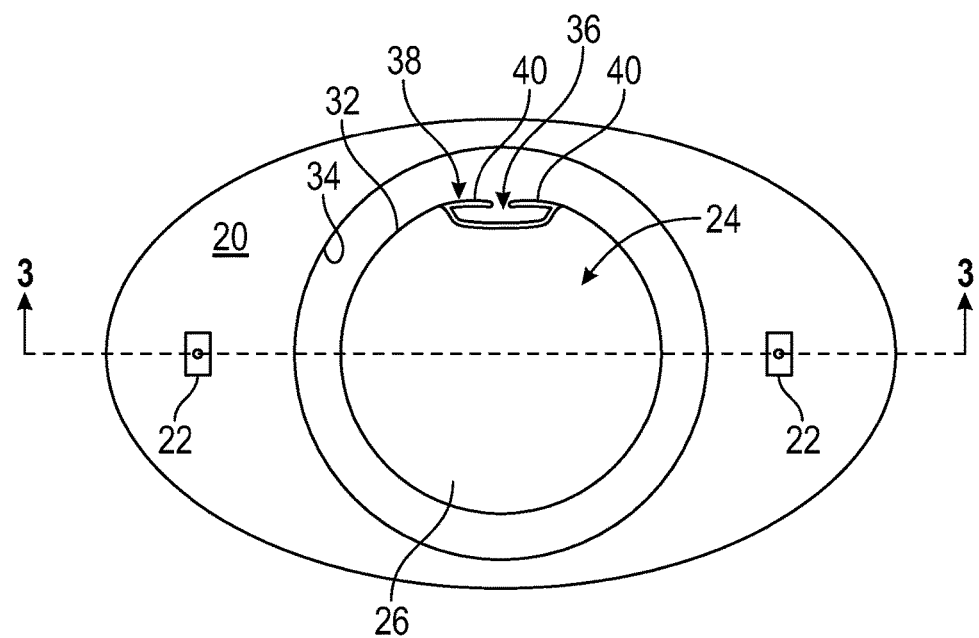
FIG. 2 is a top plan view of a base of a table or floor lamp of the present invention.
Figure 3:
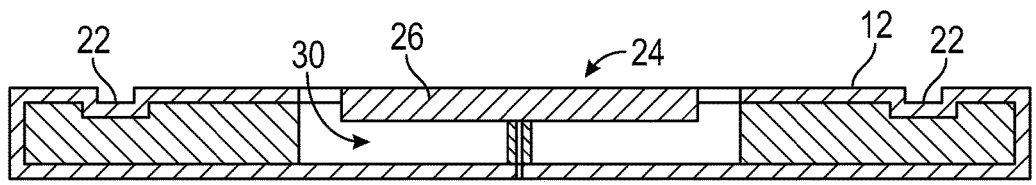
FIG. 3 is a cross sectional view taking along line 3-3 of FIG. 2.

With reference to FIG. 2 and FIG. 3, FIG. 2 illustrates a top plan view of an embodiment of base 12 and FIG. 3 illustrates a cross-sectional view of the base 12 taken along line 3-3 of FIG. 2. Base 12 has a top surface 20 and recesses 22 for receiving posts 14. Recesses 22 have openings for receiving a fastener for fastening posts 14 into place on the base 12. Base 12 has a pedestal 24 having a pedestal top 26 and a post 28. Base 12 has a cavity 30 that is accessible from the top of the pedestal 24 through a gap-ring defined by the outer periphery 32 of the pedestal top 26 and the outer periphery 34 of an opening in the top of base 12. Pedestal top 26 has a cut-out portion 36 having inserted and fastened or adhered therein a plastic cord-retention clip 38. Cord-retention clip 38 has wings 40 that are flexible. In embodiments, the power chord of the speaker assembly 18 is inserted in the cavity 30 (and may be wrapped around the post 28) and an end of the power cord for plugging into the speaker assembly is positioned through the gap between the periphery 32 of the pedestal top and the periphery 34 of the opening in the top of the base 12 and clipped into the cord-retention clip 38 for holding the cord in place. The speaker assembly is then set on the top surface of the pedestal top 26.

Figure 4:
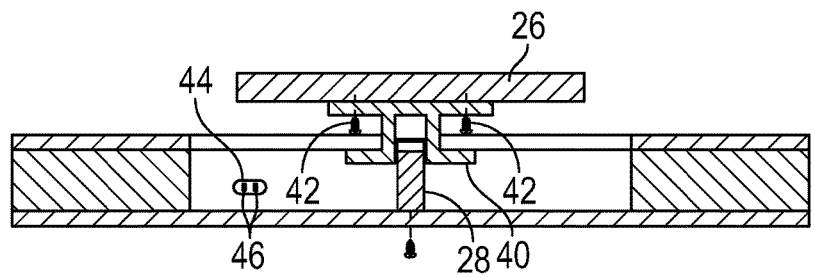
FIG. 4 is a cross sectional view of embodiments of a table or floor lamp having a pedestal with a telescoping post assembly.

With reference to FIG. 4, the pedestal 24 is telescoping in embodiments. A molded spool 40 is fastened (such as with fasteners 42) to pedestal top 26. It will be appreciated that the illustrated structure may take various forms, use a variety of fastener-types or bonds, or may be integrally molded. In embodiments, an electrical outlet 44 has receptacles 46. The outlet 44 is electrically connected to the power chord of lamp 10 and is accessible at a side wall 48 in the cavity 30 of base 12.

Figure 5:
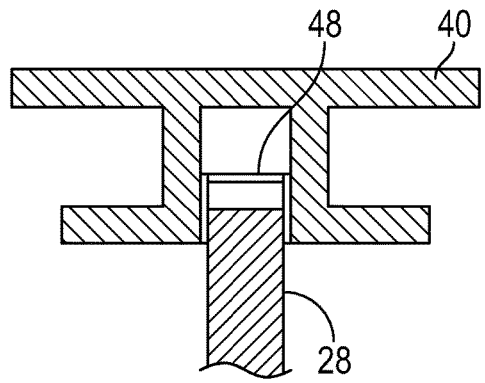
FIG. 5 is a partial view of a post assembly of a pedestal of the table or floor lamp illustrating a spool shaped piece/portion.

As illustrated in FIG. 5, the spool 40 is removably positioned on the post 28 using a frictional fit with the aid of bushing 48. In embodiments, a power chord of speaker assembly 18 is wrapped around spool 40 and spool 40 retains the cord and prevents or limits interference between the wrapped cord and the post 28 when the spool 40 and pedestal top 26 assembly are raised and lowered.

Figure 6:
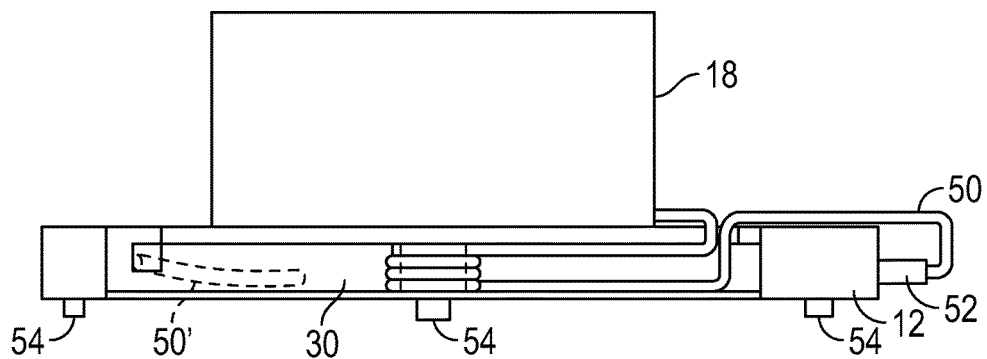
FIG. 6 is a schematic side sectional view showing a speaker cord wrapped around a post of a pedestal of the table or floor lamp.

As illustrated in FIG. 6, the power cord 50 has a plug 52 that plugs into an electrical outlet (not shown in FIG. 6) accessible on the outer peripheral sidewall of base 12. As illustrated, base 12 has feet 54 which raise the base 12 above the surface on which the feet support the lamp 10. Cord 50 wraps over the top of base 12 and through the opening in the top of base 12 and into the cavity 30. Cord 50 wraps (i.e., is wrapped by the user) around post 28 and then extends back out through the opening in the top of base 12 and plugs into speaker assembly 18. In an alternate embodiment, the power cord 50' for the speaker assembly 18 is plugged into the outlet 44 accessible inside cavity 30. Power cord 50' may also be wrapped around the post 28 and then extend out of the opening in the top of the base 12 to plug into speaker assembly 18. It should be understood that base 12 may have an outlet accessible on the outer surface, and outlet (such as outlet 44) accessible inside the cavity 30, or both. Also, it will be appreciated that the user may wrap cord 50/50' around the post 28 after plugging the cord 50/50' into an outlet on the base 12 and then hold the cord generally above the base 12 and wrap it through the gap between the pedestal top 26 and the periphery 34 of the opening in the top of base 12.

Figure 7:
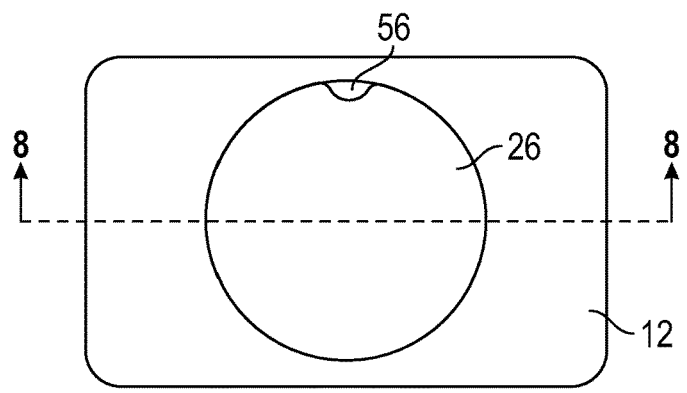
FIG. 7 is a top plan view of a base and pedestal of embodiments of the table or floor lamp.
Figure 8:
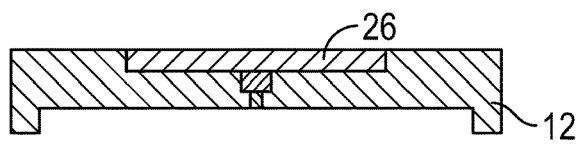
FIG. 8 is a cross-sectional side elevational view of embodiments of a base having a pedestal of the table or floor lamp.
Figure 9:
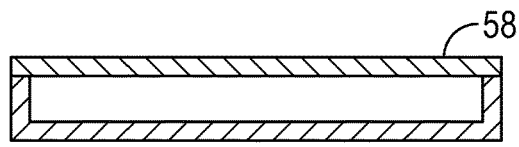
FIG. 9 is a cross-sectional side elevational view of embodiments of a base section and/or pedestal having a diffuser and LEDs.

With reference to FIGS. 7 and 8, an embodiment of base 12 is illustrated in which the pedestal top 26 fits snugly within the opening in the top of base 12 with a cutaway portion 56 for passing therethrough the power cord of the speaker assembly 18.

With reference to FIG. 8, an embodiment is shown in which the top of the base 12 has a clear top or a diffuser 58 through which light emitting from cavity 30 may pass. It will be appreciated that diffuser 58 may be the top of pedestal 24.

Figure 10:
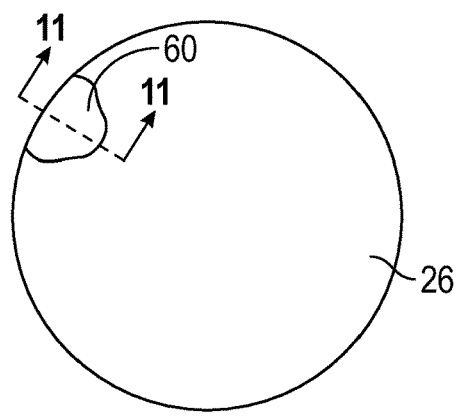
FIG. 10 is a bottom plan view of embodiments of a top of a pedestal of the table or floor lamp.
Figure 11:
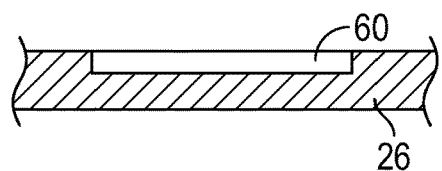
FIG. 11 is a cross-sectional view taken along line 11-11 of FIG. 10 illustrating a cavity on the bottom of the top of the pedestal for receiving a plug of a speaker assembly cord.

With reference to FIGS. 10 and 11, a bottom plan view of pedestal top 26 is illustrated and includes a cutaway portion 60 for receiving at least a top portion of the plug of the cord of speaker assembly 18 that is plugged into outlet 44 in cavity 30 of base 12. This enables a lower profile to be maintained for the base even if the plug is relatively thick in height.

Figure 12:
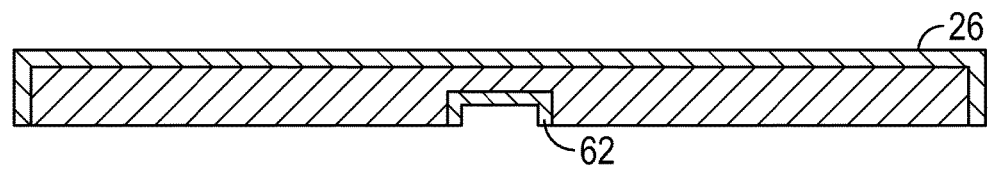
FIG. 12 is a cross-sectional side elevational view of a top of a pedestal of embodiments of the table or floor lamp.

With reference to FIG. 12, pedestal top 26 is illustrated in more detail and includes a bushing 62 for frictionally receiving post 28.

Figure 13:
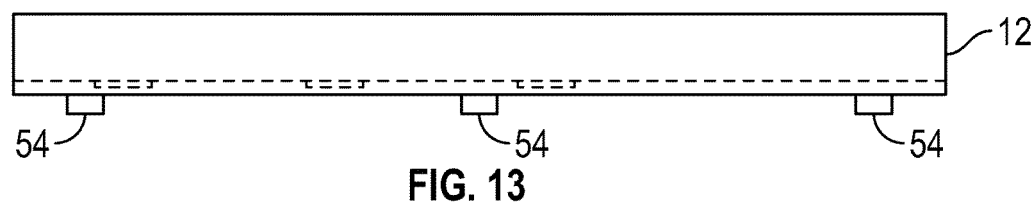
FIG. 13 is a side elevational view of a base of the table or floor lamp.
Figure 14:
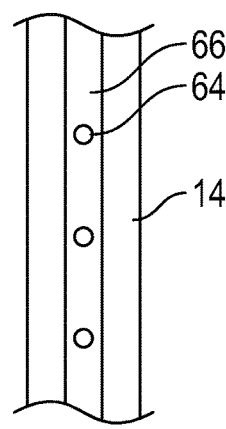
FIG. 14 is a sectional view of a component of the table or floor lamp showing an LED light strip or cavity for LED lights (sconce lights having a bar and recessed LEDs is known at the time of this filing)

FIG. 13 illustrates base 12 with LEDs 64 for emitting light indirectly out from the bottom of base 12 and through the gap opening in the top of base 12. FIG. 14 illustrates post 14 and illustrates recessed LEDs 64 (which may be embedded in a flexible strip) in a channel 66 on the inside of the post 14.

Figure 15:
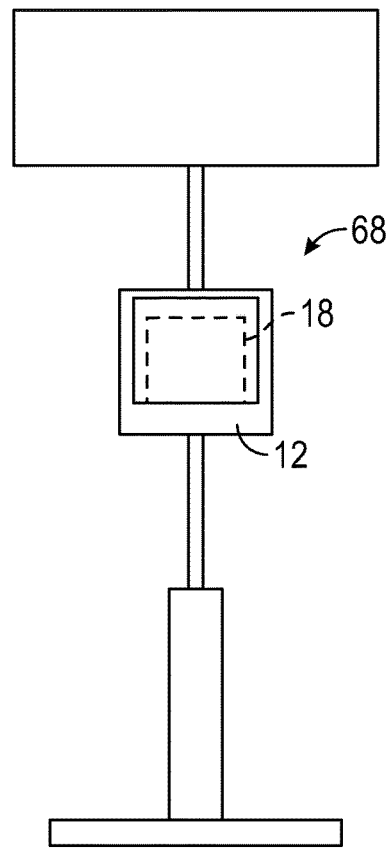
FIG. 15 is a side elevational view of a floor lamp illustrating that features of the lamp and particularly features specified as the base of the lamp in the case of a table or desk lamp may be elevated above the surface on which the lamp rests and therefore not be in the "base" but in a portion of the lamp that is above the base.

FIG. 15 illustrates a floor lamp 68 in which the base 12 (with cavity 30 therein for retaining cord 50 of the speaker assembly 18), for supporting the speaker assembly 18, is positioned on a post 68 of the floor lamp and thereby provides support structure on floor lamp 68 for speaker assembly 18. It should thus be understood that the base 12 and features of the base 12 illustrated and described herein may also be embodied in a support portion of a lamp in which the support portion provides a base 12 for the speaker assembly but the support portion is elevated above the surface on the lamp structure, such as in the case of floor standing lamp 68. Accordingly, the term "base" as used herein should be construed to mean a base for a lamp assembly that is useful for supporting a separate speaker assembly, where the base rests on a surface on which the lamp rests or where the base is elevated above a surface, on which the lamp rests, by a support structure.

Figure 16:
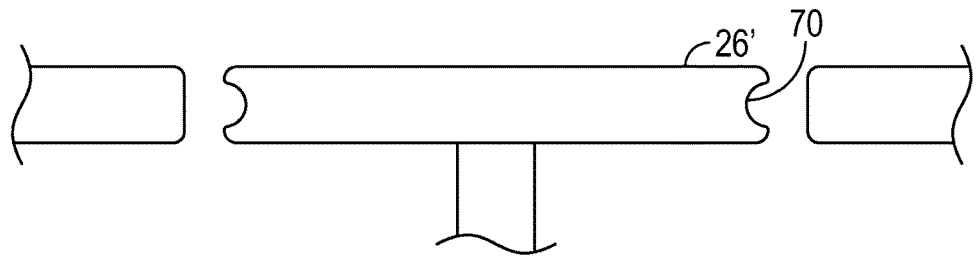
FIG. 16 is a partial side elevational view of an alternative design for a pedestal for lamp having a recessed outer periphery for receiving a removable chord of a speaker assembly.

FIG. 16 illustrates an alternate embodiment of pedestal top 26'. Pedestal top 26' has an indented recess 70 at an outer periphery of pedestal top 26' which is adapted to receive cord 50 of speaker assembly 18 wrapped thereabout.

Figure 17:
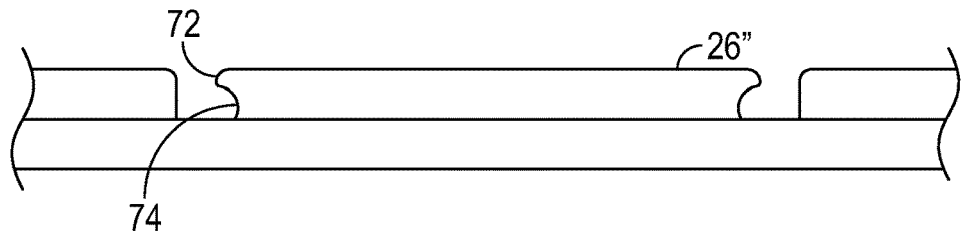
FIG. 17 is a partial side elevational view of yet another alternative design for a pedestal for a lamp having an upper peripheral dimension that is greater than a lower peripheral dimension for creating a recess for receiving removable chord of a speaker assembly.

FIG. 17 illustrates an additional embodiment of the pedestal, denoted by 26", which includes an upper portion 72 that is larger than a lower portion 74 to enable wrapping cord 50 of the speaker assembly 18 around the pedestal 26".

Figure 18:
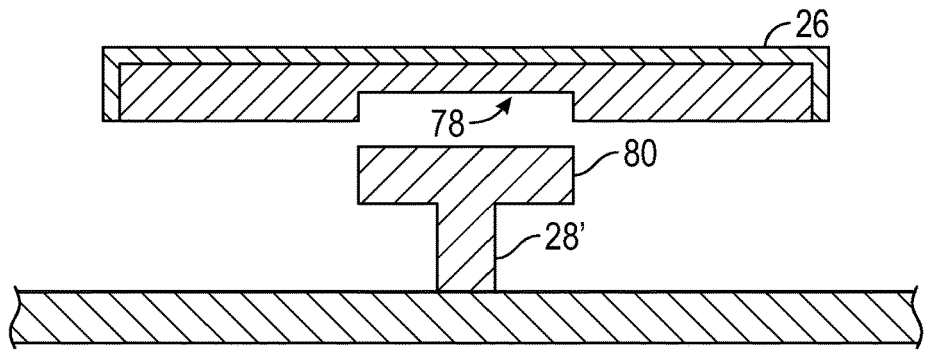
FIG. 18 is a partial cross-sectional view of a pedestal of a lamp for supporting a portable speaker assembly, wherein the pedestal top has a removable top with a recess on the bottom side of the removable top and a post has an enlarged upper end for receipt by the recess.

FIG. 18 illustrates an embodiment in which pedestal top 26 has a post-receiving recess 78 on a bottom side for frictionally and snugly and removably receiving a post 28' with an enlarged top 80. Bushings (not shown in FIG. 18) may be employed as will be understood by those with skill in the mechanical arts.

Figure 19:
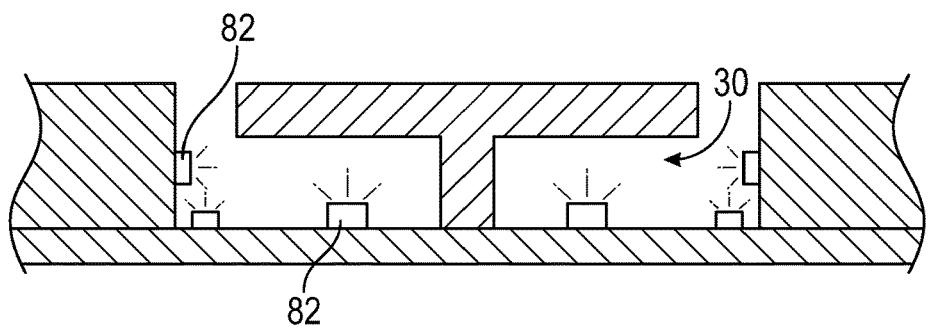
FIG. 19 is a partial cross-sectional view of a base of a lamp of the invention and illustrates LEDs mounted in a cavity of a lamp of the invention.

FIG. 19 illustrates an embodiment with LEDs 82 in cavity 30.

Figure 20:
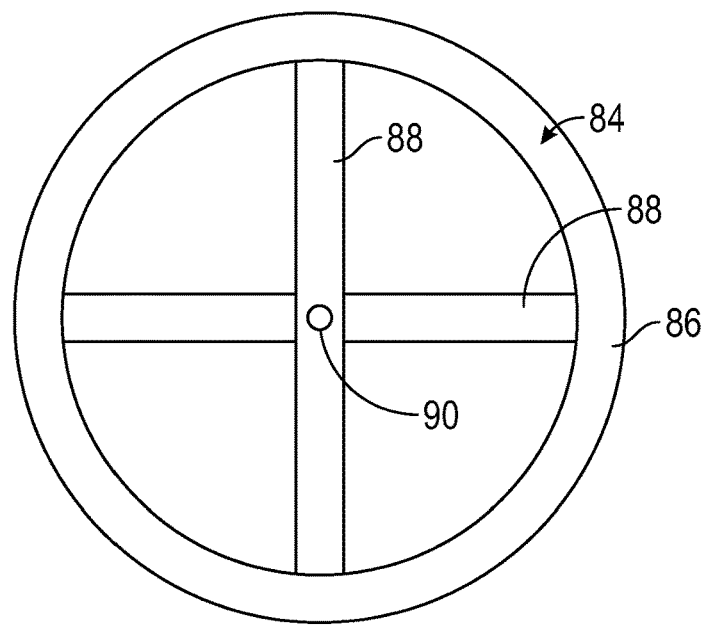
FIG. 20 illustrates an exemplary embodiment of a removable bottom component of a base of the invention.
Figure 21:
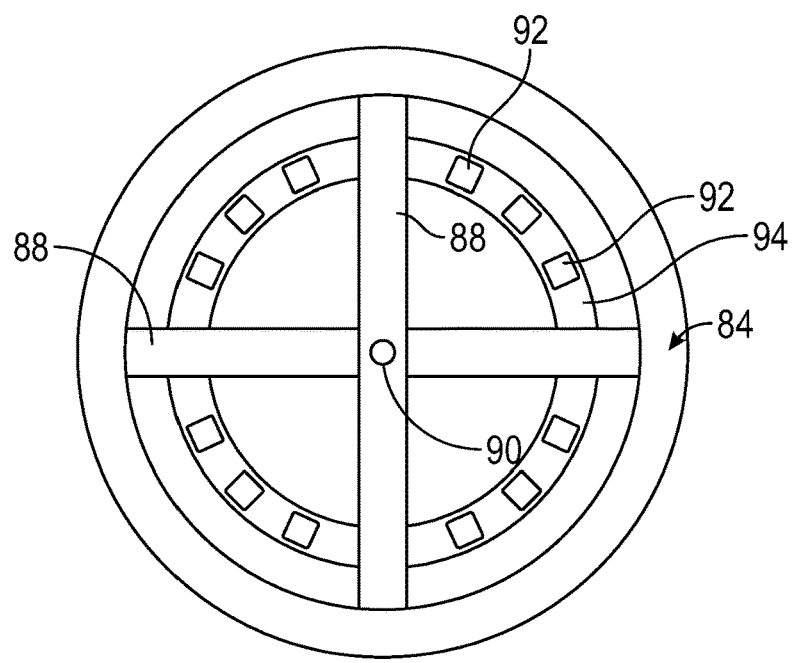
FIG. 21 illustrates an embodiment of a removable bottom component of a base of the invention.
Figure 22:
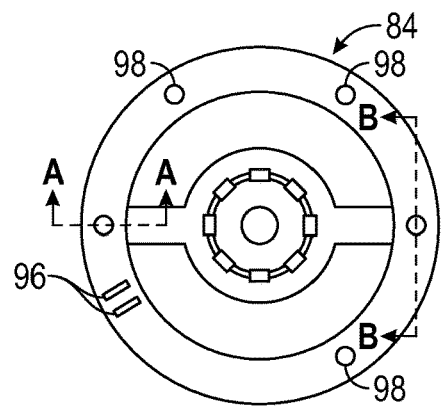
FIG. 22 illustrates an embodiment of a removable bottom component, of a base of the invention.

FIGS. 20-22 illustrate embodiments of a removable bottom bracket portion 84 of base 12. Bottom bracket 84 has an outer ring 86 and cross members 88. Bottom bracket portion 84 may be fastened to the bottom of base 12 in a variety of conventional fastening manners, such as with a bolt through opening 90. FIG. 21 includes LEDs 92 on an inner ring 94. LEDS may align with the gap opening in the top of base 12.

It will be understood that LEDS in this application will be connected to power to illuminate and may be connected with each other by wiring 100 that may (for example) be positioned inside or on a bottom (or top, as shown) surface of bottom bracket portion 84. In particular, as illustrated in FIG. 22, an additional or alternate embodiment of bottom bracket 84 is illustrated. Bottom bracket portion 84 of base 12 includes prongs 96 that plug into an outlet (not shown) in the bottom of base 12, which in turn is wired to enable power to the outlet when the power cord of the lamp 12 (or 68) is plugged in to a power source, to connect the LEDs 92 to power for illumination. LEDs 92 may include a separate on/off power switch and a dimmer switch (and circuitry). Additional posts or bayonets 98 snap-fit the bottom bracket 84 to the bottom of base 12.

Figure 22A:
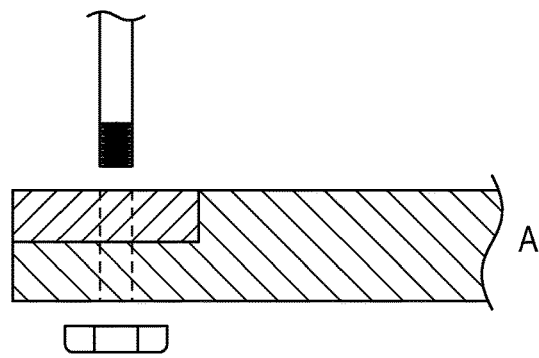
FIG. 22A is a partial cross-sectional view taken along line A-A of FIG. 22.
Figure 22B:
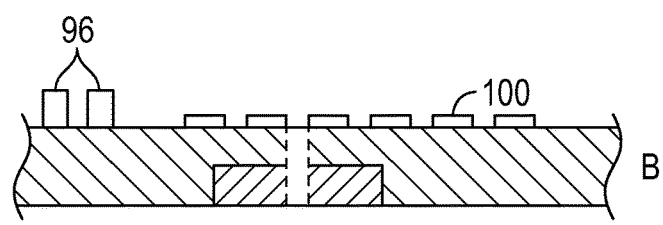
FIG. 22B is a partial cross-sectional view taken along line B-B of FIG. 22.

FIGS. 22A and 22B are taken along lines A-A and B-B of FIG. 22 and illustrate assembly details.

Figure 23:
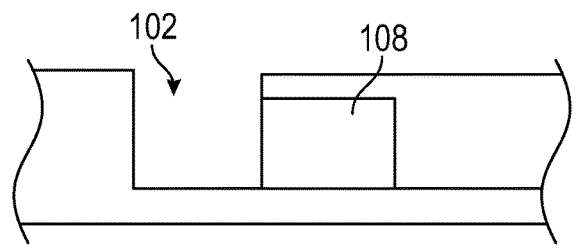
FIG. 23 is a partial elevational view taken along line 23-23 of FIG. 24.

With reference to FIGS. 23 and 24 and first to FIG. 24, in embodiments the top of base 12 has a cord channel 102 or receiving a portion of the power cord 50 of speaker assembly 18 when the cord 50 is plugged into an outlet 104 on the outside of base 12 (with a bulk of the cord 50 preferably being positioned in cavity 30) and an end extending outwardly through the cutaway 106 for plugging into the speaker assembly 18 that will rest on top surface of pedestal 24. Lamp 10 (or 68) will include a power on/off switch 108 and, in embodiments, a dimmer switch (with associated dimmer circuitry, not shown) 110 for turning on and off and dimming, respectively, a light or bulb on lamp 10/68. It should be understood that all lights/lamps/LEDs on lamp 10/68 may have on/off and dimming switches/functionality. FIG. 23 is taken along lines 23-23 of FIG. 24 and further illustrates a notch 108 beneath the top surface of pedestal 24 for retaining cord 50 when it is wrapped around the pedestal post 28.

FIGS. 25 and 26 illustrate an embodiment of lamp 10/68 in which a structure of the lamp post includes a frame portion 110 with opening to enable the cord 50 of speaker assembly 18 to pass through.

Figure 28:
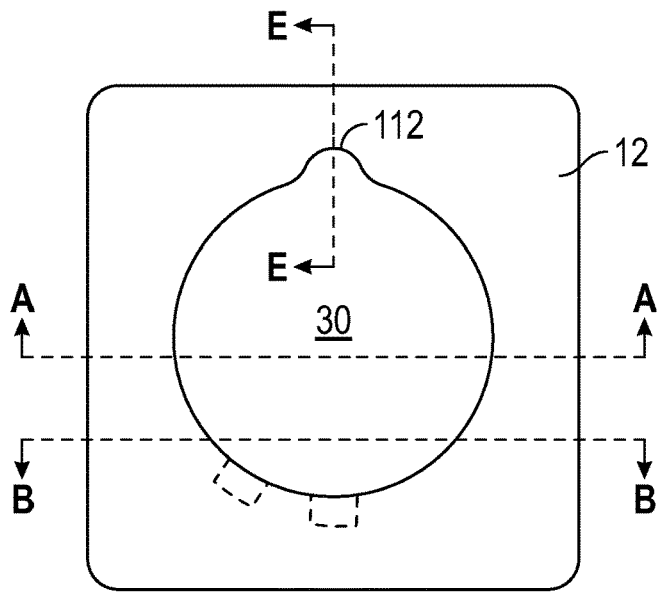
FIG. 28 illustrates a top plan view of an embodiment of a base or base portion of the table or floor lamp of the invention.
Figure 28A:
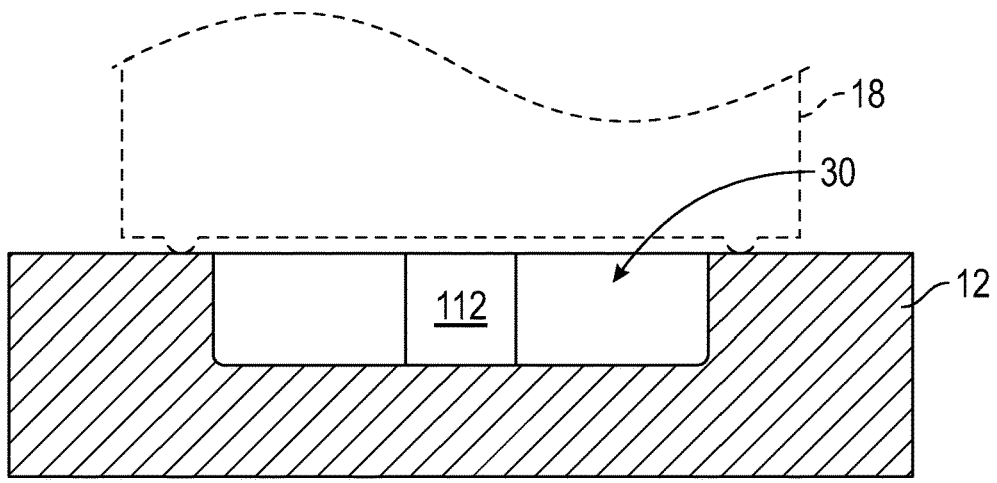
FIG. 28A is a cross-sectional view taken along line A-A of FIG. 28.
Figure 28B:
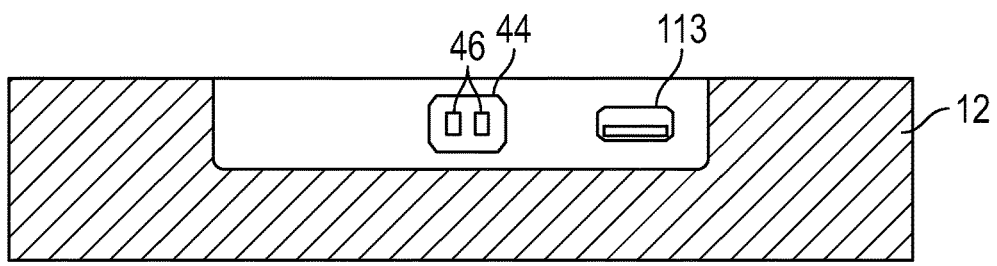
FIG. 28B is a cross-sectional view taken along line B-B of FIG. 28.

FIG. 28 illustrates a top plan view of base 12 with an opening to the cavity 30 at the top of base 12 (and no pedestal positioned in the base 12). The open cavity 30 receives the cord 50 of the speaker assembly. A cut-away 112, for receiving speaker cord 50 and enabling an end of the speaker cord 50 to extend outwardly from the cavity 30 when the speaker assembly is in place over the cavity 30, is shown. As shown in FIG. 28A, speaker assembly 18 straddles and covers the opening to cavity 30. FIG. 28B also illustrates a USB port 113. An AC/DC power supply may be housed in base 12.

Figure 28C:
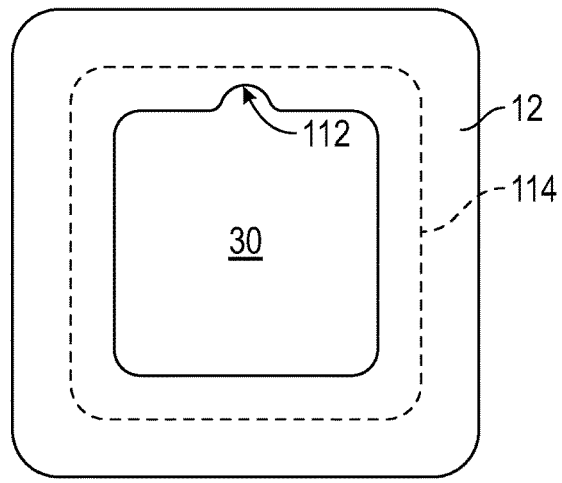
FIG. 28C is a top plan view of a base or base portion of the table or floor lamp of the invention and, in particular, illustrating in dashed lines the dimension of a lower portion of a cavity defined by the base or base portion.
Figure 28D:
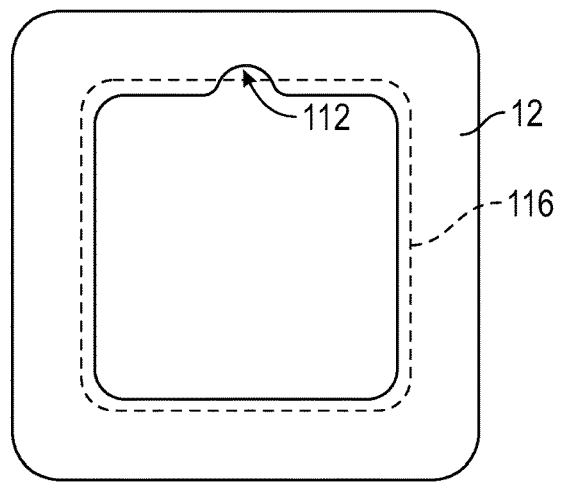
FIG. 28D is a top plan view of a base or base portion of the table or floor lamp of the invention and, in particular, illustrating in dashed lines the dimension of a wireless speaker assembly when the wireless speaker assembly is sitting on top of the base or base portion.
Figure 28E:
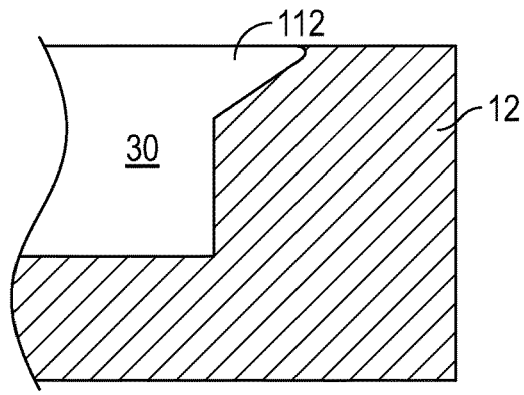
FIG. 28E is a partial cross-sectional view illustrating a speaker-cord-receiving cut-away portion of the base of the lamp of the invention.
Figure 28F:
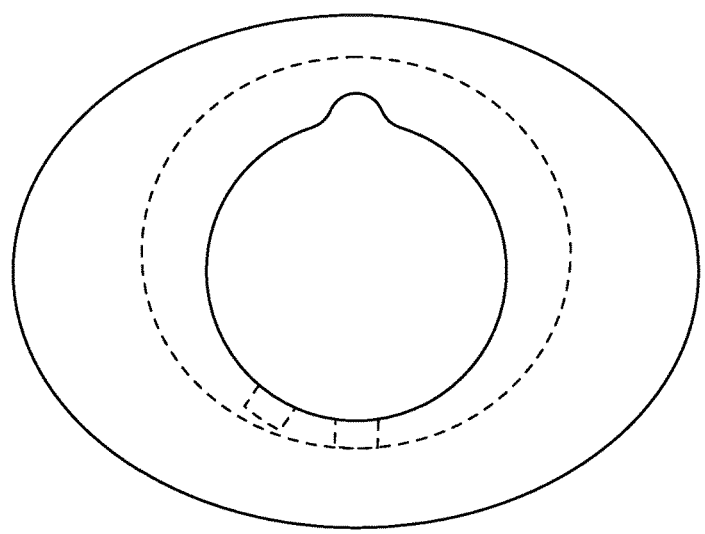
FIG. 28F is a top plan view of an embodiment of a base of the lamp of the invention and, in particular, illustrating, illustrating in dashed lines the shape and dimension of a lower portion of a cavity defined by the base or base portion and the positions of outlets or sockets positioned in the cavity.
Figure 28G:
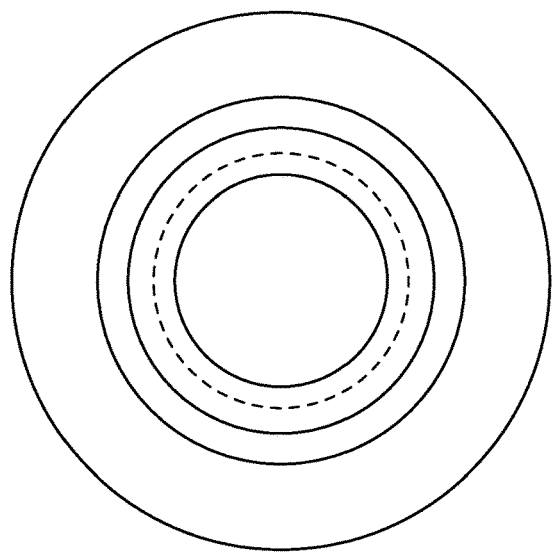
FIG. 28G is a top plan view of an embodiment of a base of the lamp of the invention and, in particular, illustrating, illustrating a base that has a central opening with a larger lower cavity portion (illustrated in dashed lines) and a gap.
Figure 28H:
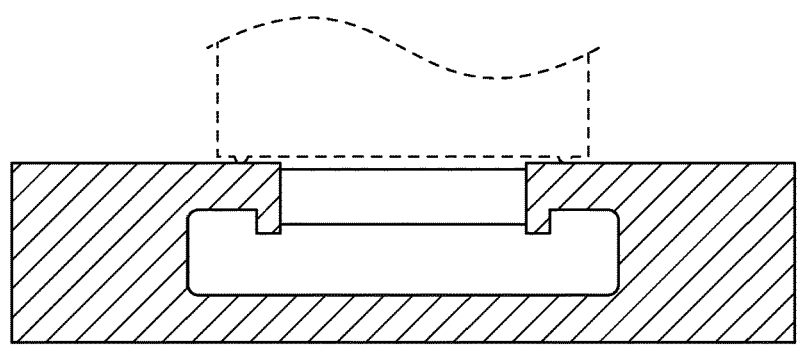
FIG. 28H is a cross-sectional view of an embodiment of a base of the lamp of the invention illustrating in dashed lines the position of a wireless speaker assembly sitting on the top of the base.

FIG. 28C illustrates base 12 and, in particular, illustrates in dashed lines 114 the periphery of the cavity 30. As illustrated, a lower portion of the cavity 30 is larger than the opening to the cavity 30 (see also FIG. 28K). FIG. 28D further illustrates in dashed lines 116 the position of periphery of speaker assembly 18 when speaker assembly 18 is positioned over cavity 30. As illustrated, at least a portion of cutaway 12 remains uncovered by speaker assembly 181 to enable an end of power cord 50 of speaker assembly 18 to extend from the cavity for plugging in to the speaker assembly 18. Thus, the speaker assembly 18 fully covers the cavity 18 and retains the cord 50 beneath it in the cavity 30 with the small opening in the cutaway 112 enabling the cord 50 to extend therethrough. FIG. 28E is a partial cross-sectional view of this embodiment.

Figure 28I:
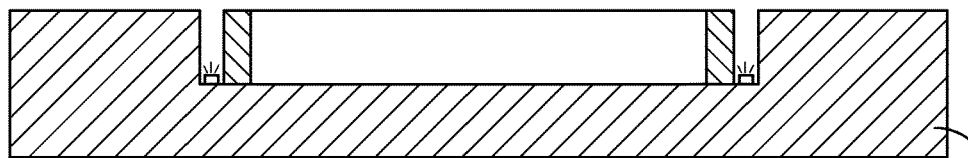
FIG. 28I is a cross-sectional view of an embodiment of a base of the lamp of the invention.

FIG. 28I illustrates an additional embodiment of base 12.

Figure 28J:
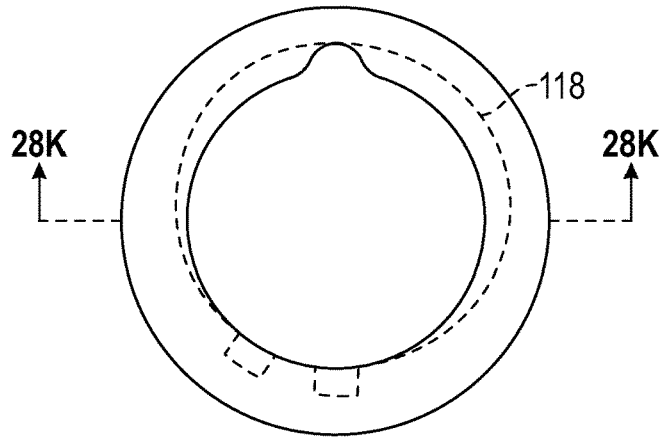
FIG. 28J is a top plan view of an embodiment of a base of the lamp of the invention and, in particular, illustrating in dashed lines the shape and dimension of a lower portion of a cavity defined by the base or base portion and the positions of outlets or sockets positioned in the cavity.

FIG. 28J illustrates a position of outlet 44 and USB port 113 proximate a front of base 12 on the inside peripheral wall of cavity 30 of base 12. This position of outlet 44 and USB port 113 prevents these components from being seen when the speaker assembly 18 is not in place on the base and the lamp is viewed from the front. The shape and size of the cavity 30 beneath the top of the base 12 is illustrated by dashed line 118.

Figure 28K:
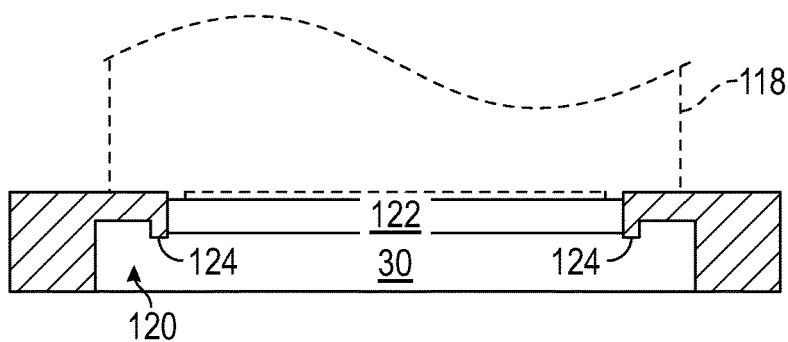
FIG. 28K is a cross-sectional view of an embodiment of a base of the lamp of the invention taken along line 28K-28K of FIG. 28J and further illustrating in dashed lines the position of a wireless speaker assembly sitting on the top of the base.

FIG. 28K illustrates an embodiment of base 12 in which a lower portion 120 of cavity 30 is larger than an upper portion 122 of (or opening to) the cavity 30 and which includes hook extensions 124 for further retaining cord 50 within cavity 30. FIG. 28K further shows that the opening to cavity 30 has a dimension such that feet 54 of speaker assembly 18 fit snugly in the opening nest the speaker assembly 18 in the opening and to further retain the speaker assembly 18 on the top surface of base 12.

Figure 28L:
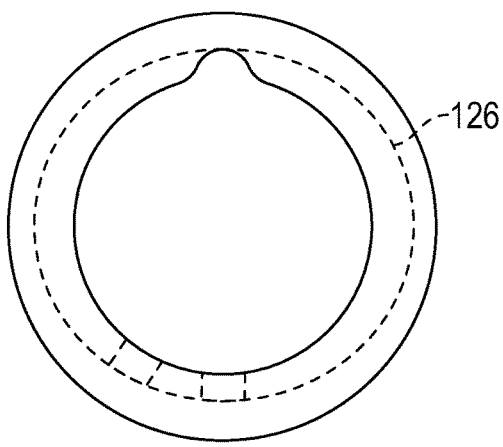
FIG. 28L is a top plan view of an embodiment of a base of the lamp of the invention and, in particular, illustrating, illustrating in dashed lines the shape and dimension of a lower portion of a cavity defined by the base or base portion and the positions of outlets or sockets positioned in the cavity.
Figure 29:
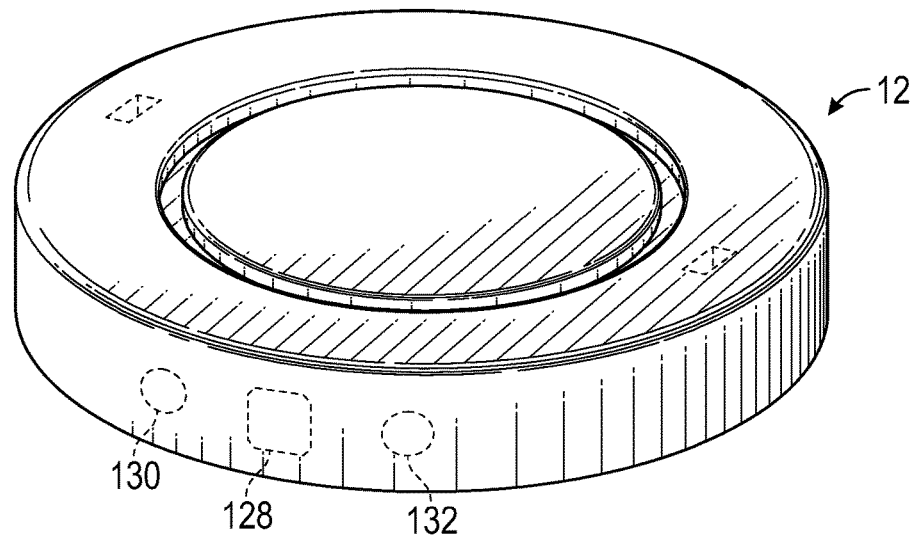
FIG. 29 is a perspective view of a base or support portion of a lamp of the invention.
Figure 30:
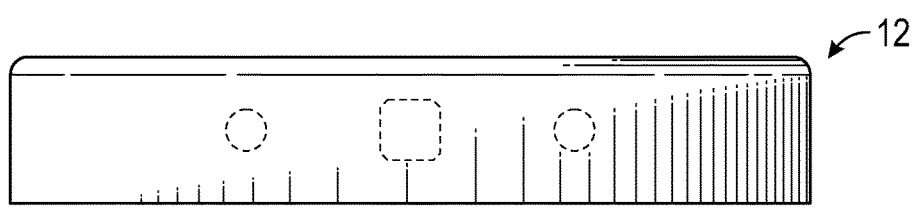
FIG. 30 is a rear elevational view of the base or support portion illustrated in FIG. 29.
Figure 31:
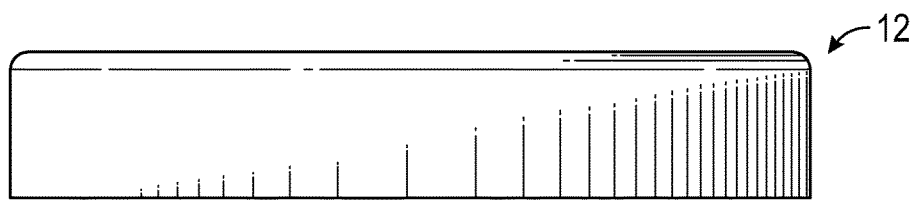
FIG. 31 is a front elevational view of the base or support portion illustrated in FIG. 29.
Figure 32:
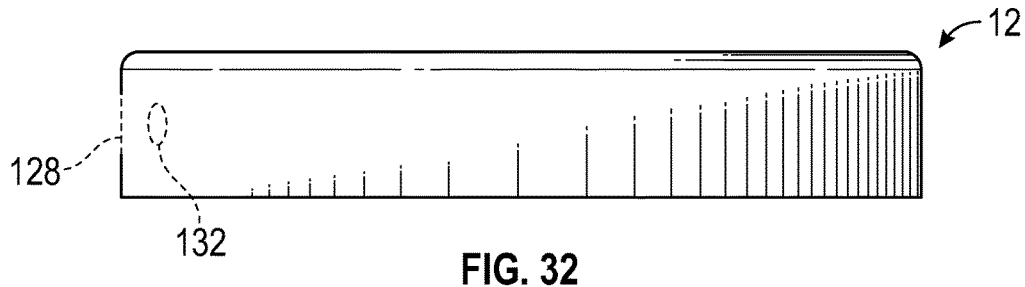
FIG. 32 is front elevational view of the base or support portion illustrated in FIG. 29.
Figure 33:
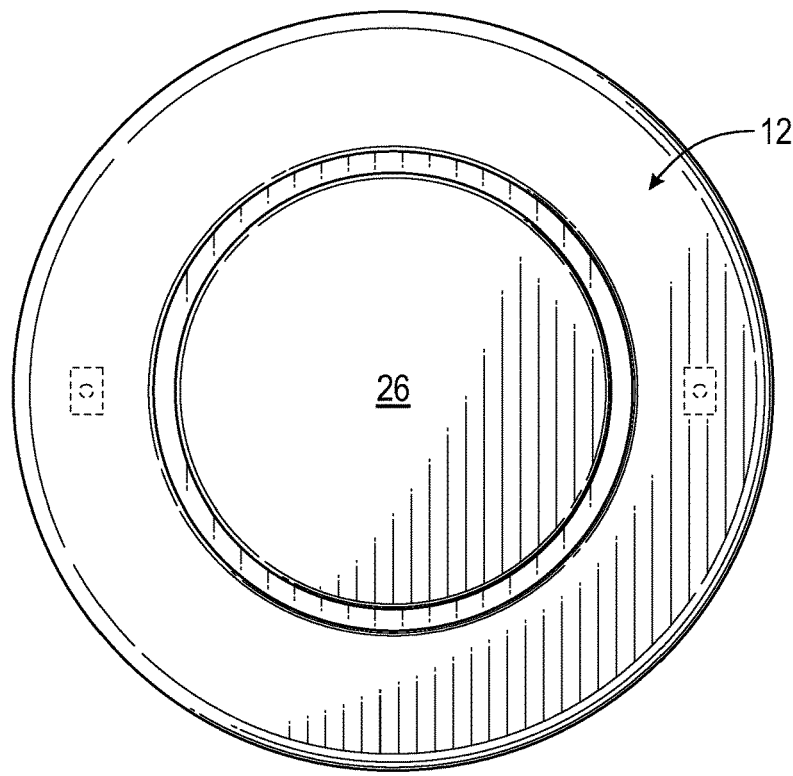
FIG. 33 is a top plan view of the base or support portion illustrated in FIG. 29.
Figure 34:
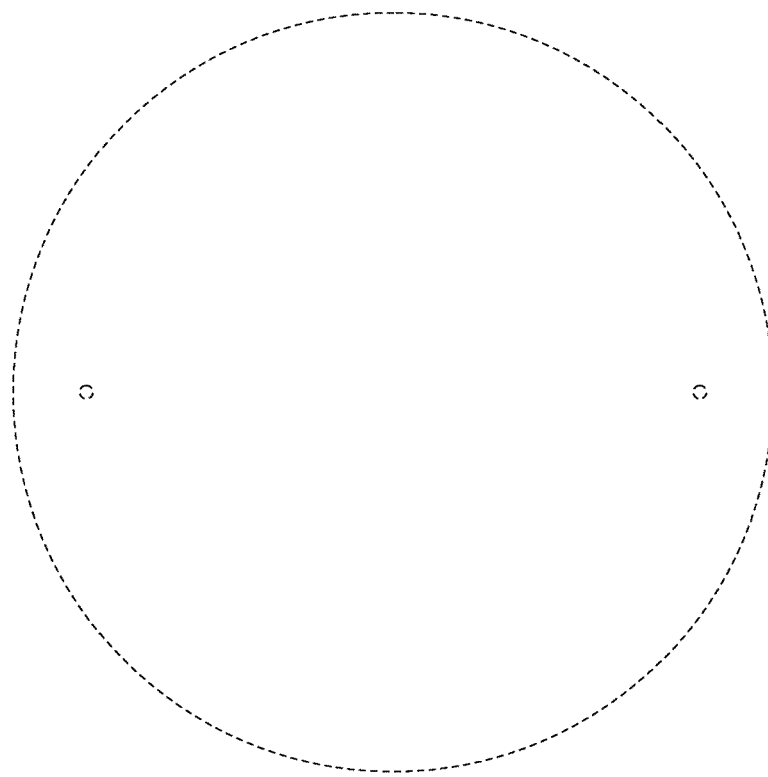
FIG. 34 is a bottom plan view shown in dashed lines of the base or support portion illustrated in FIG. 29.
Figure 35:
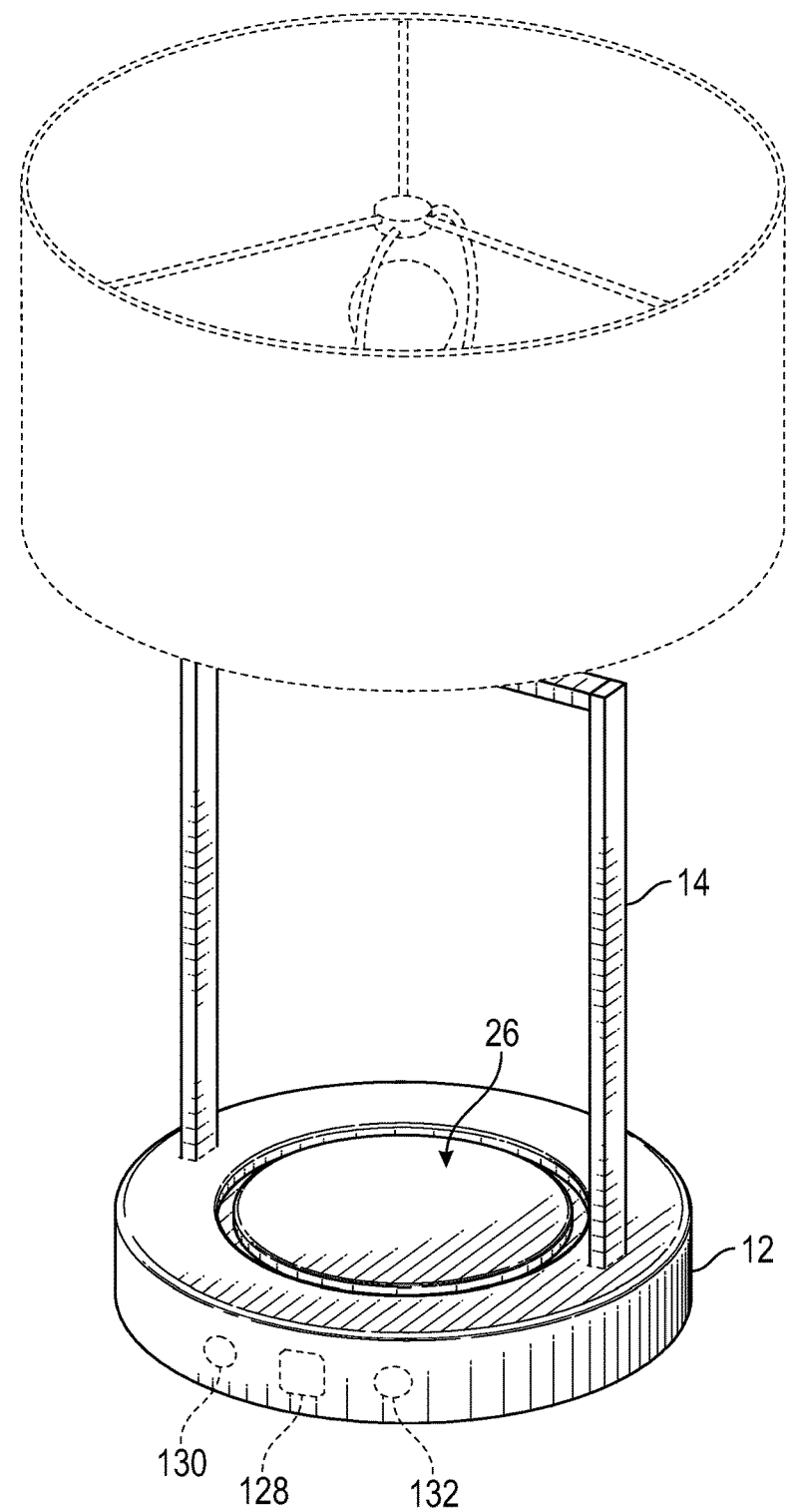
FIG. 35 is a perspective view of an embodiment of a lamp of the invention.
Figure 36:
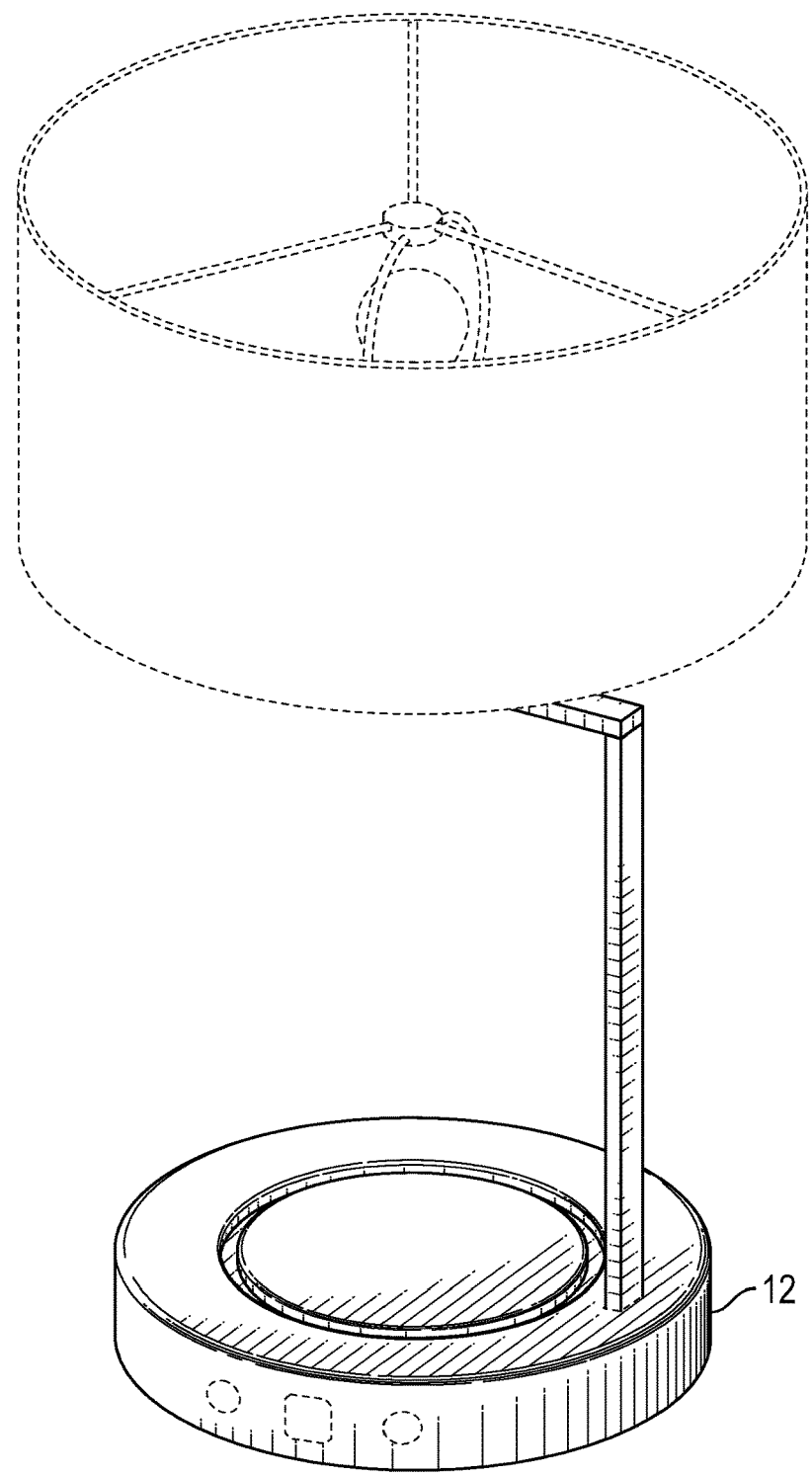
FIG. 36 is a perspective view of an embodiment of a lamp of the invention.
Figure 37:
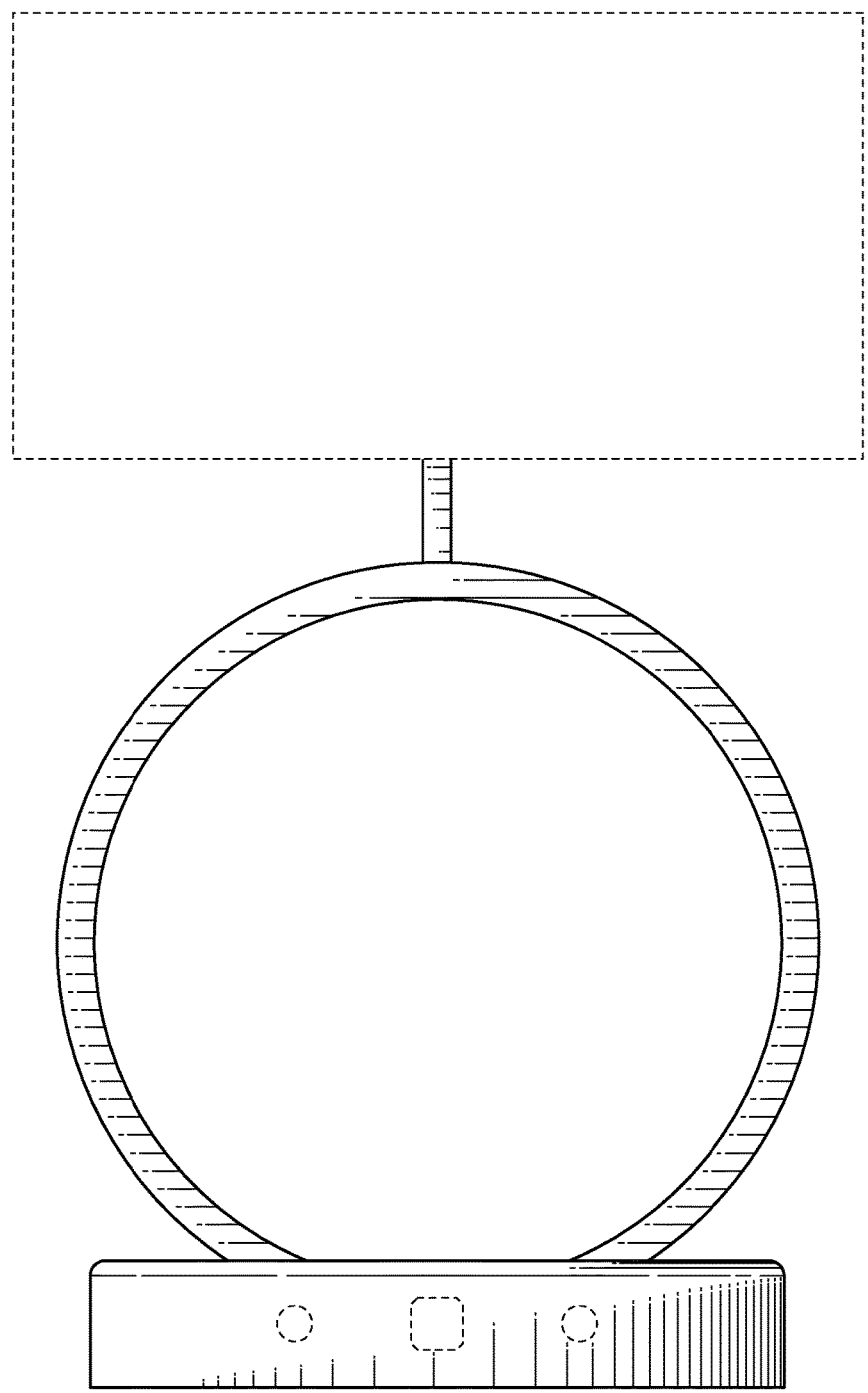
FIG. 37 is an elevational view of an embodiment of a lamp of the invention.
Figure 38:
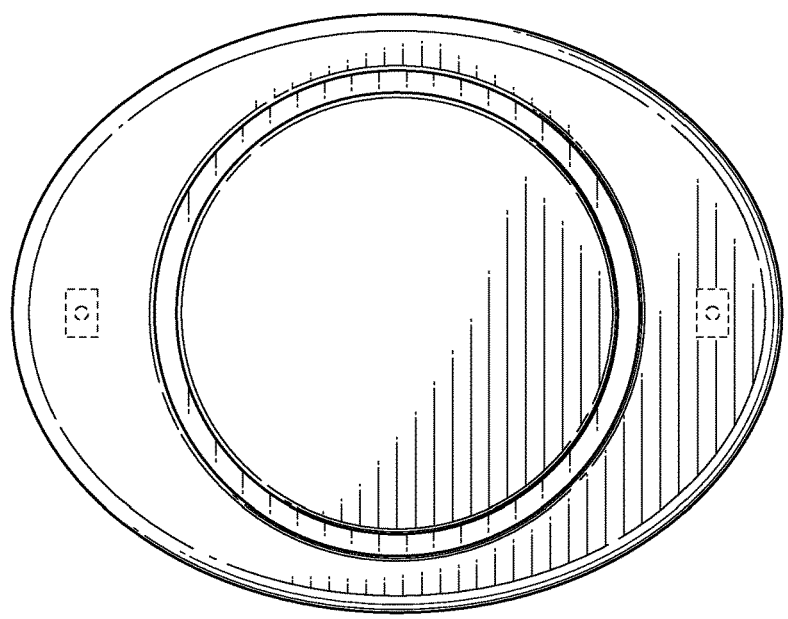
FIG. 38 is a top plan view of an embodiment of a base or support portion of a lamp of the invention.
Figure 39:
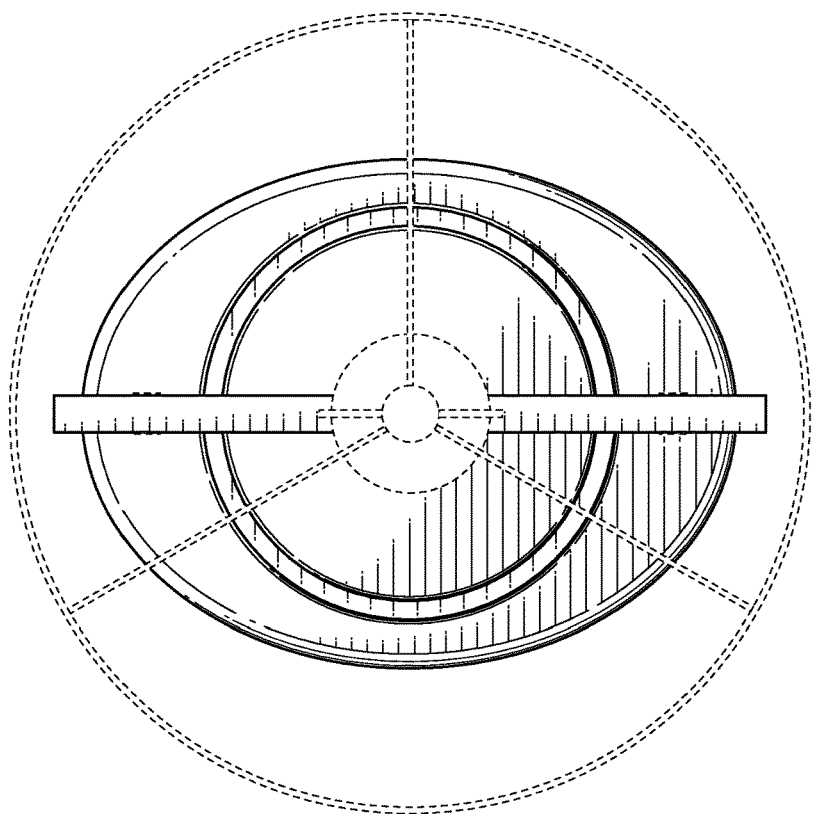
FIG. 39 is a top plan view of an embodiment of a table or floor lamp of the invention.
Figure 40:
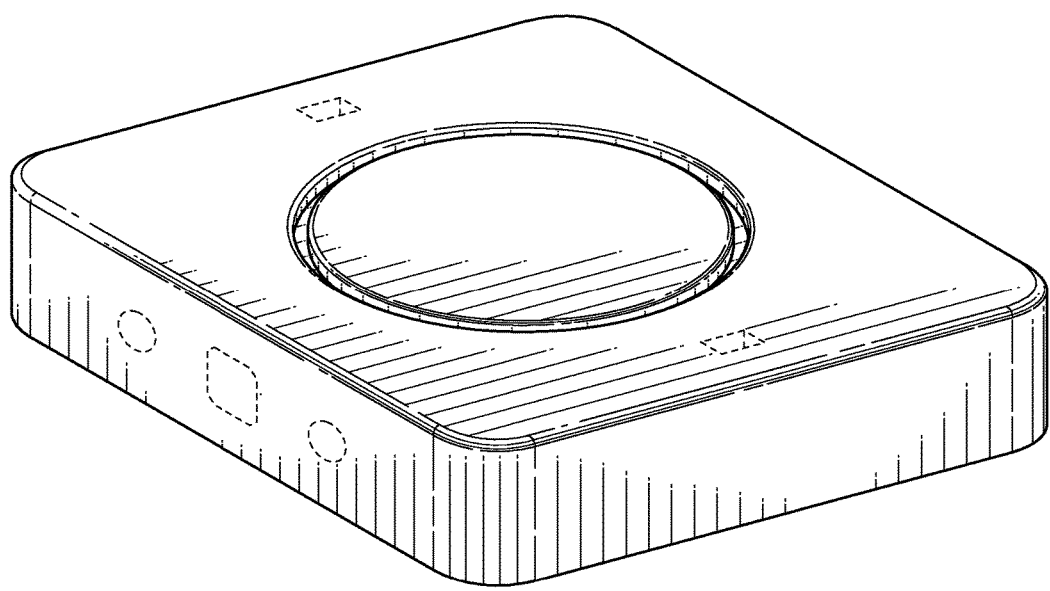
FIG. 40 is a perspective view of an embodiment of a base or support portion of a lamp of the invention.
Figure 41:
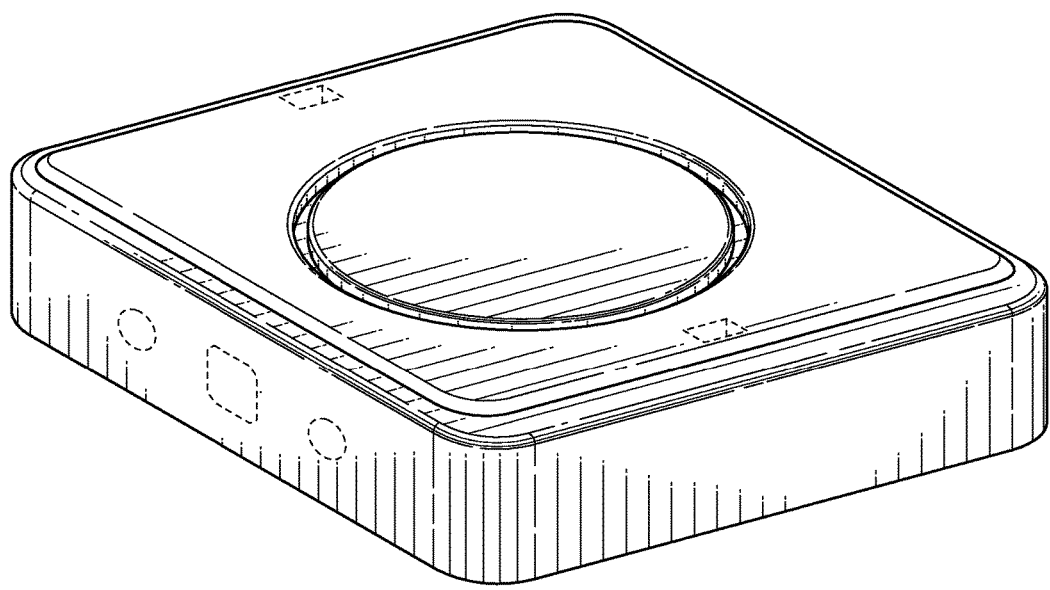
FIG. 41 is a perspective view of an embodiment of a base or support portion of a lamp of the invention.
Figure 42:
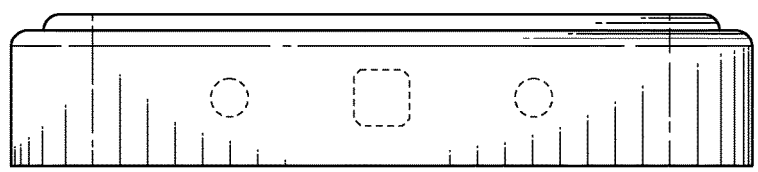
FIG. 42 is a side elevational view of the embodiment of a base or support portion of a lamp of the invention illustrated in FIG. 41.
Figure 43:
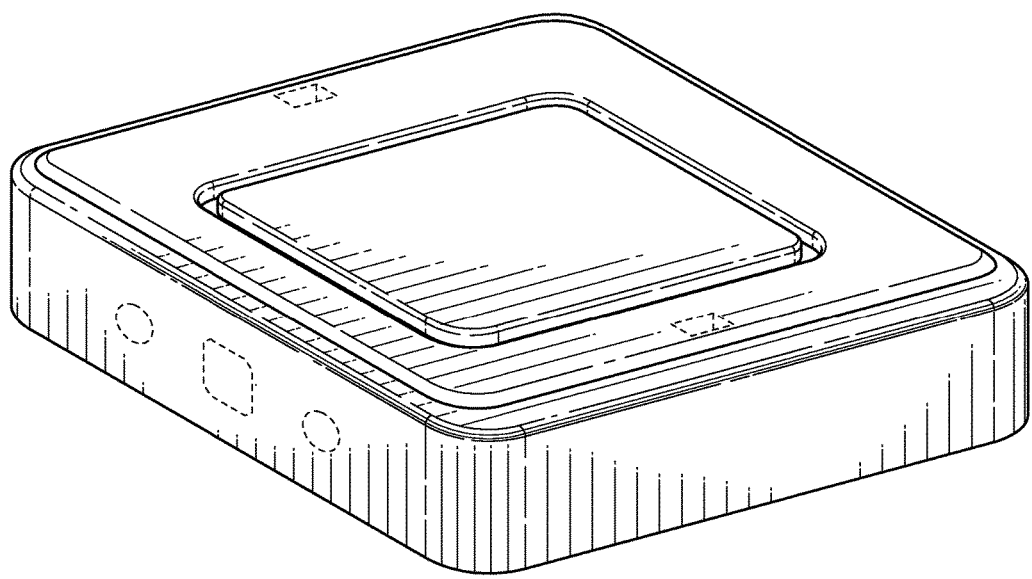
FIG. 43 is a perspective view of an embodiment of a base or support portion of a lamp of the invention.
Figure 44:
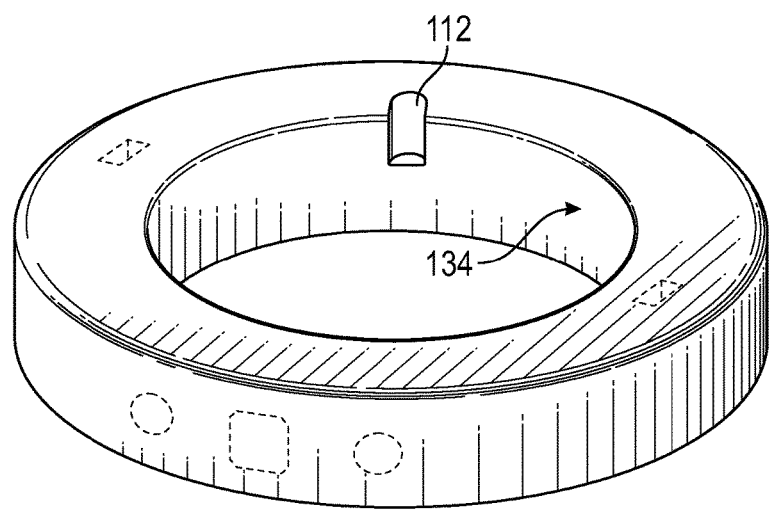
FIG. 44 is a perspective view of an embodiment of a base or support portion of a lamp of the invention.
Figure 45:
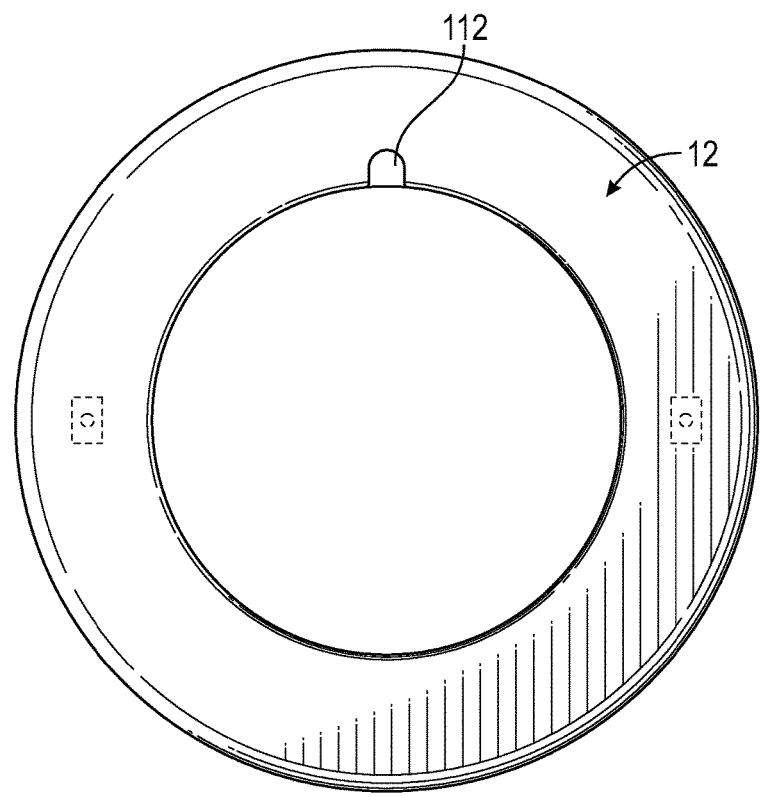
FIG. 45 is a top plan view of the embodiment of a base or support portion of a lamp of the invention illustrated in FIG. 44.
Figure 46:
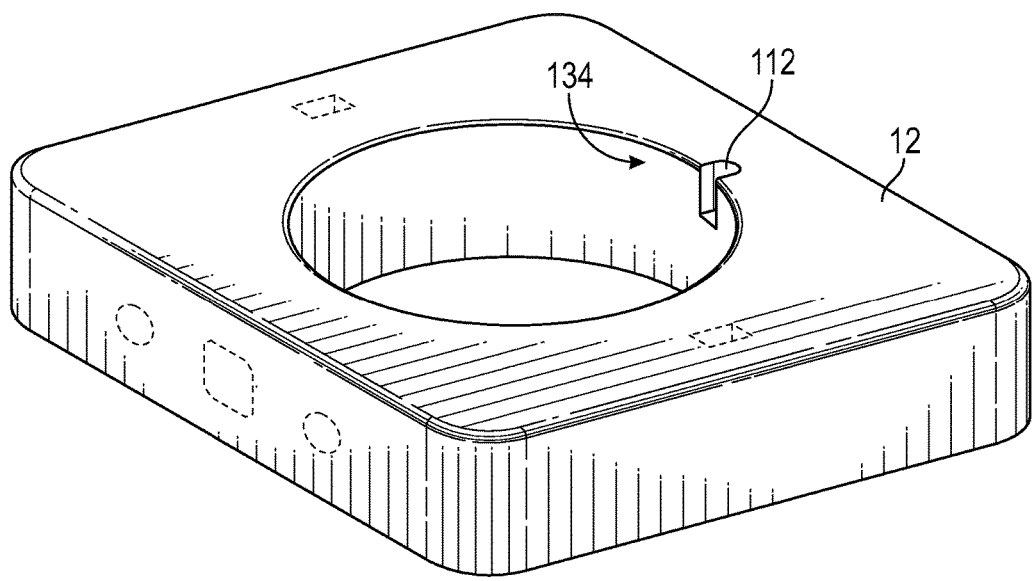
FIG. 46 is a perspective view of an embodiment of a base or support portion of a lamp of the invention.
Figure 47:
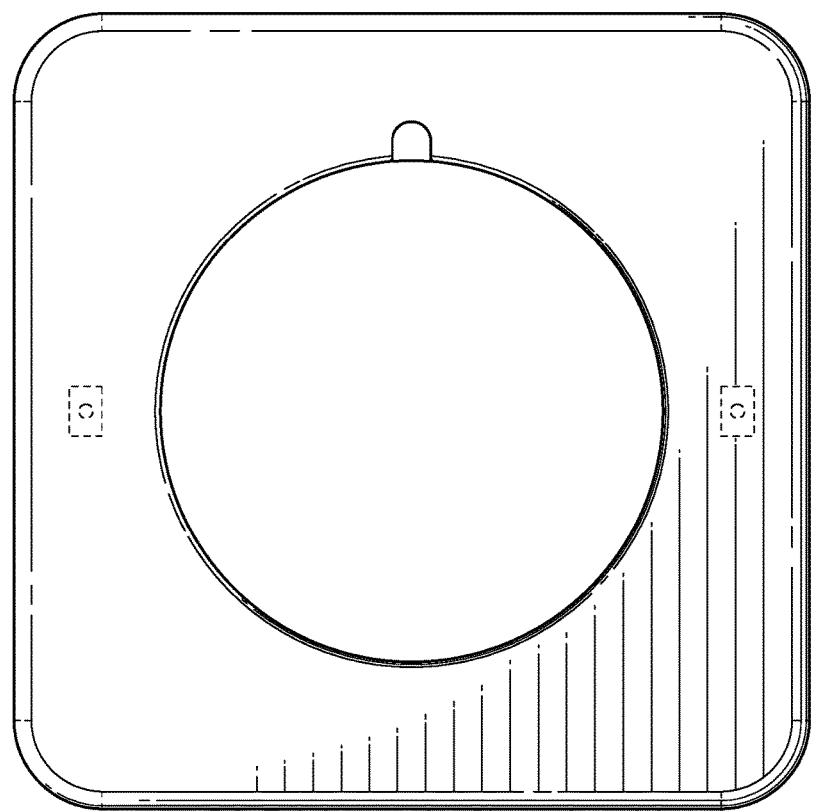
FIG. 47 is a top plan view of the embodiment of a base or support portion of a lamp of the invention illustrated in FIG. 46.
Figure 48:
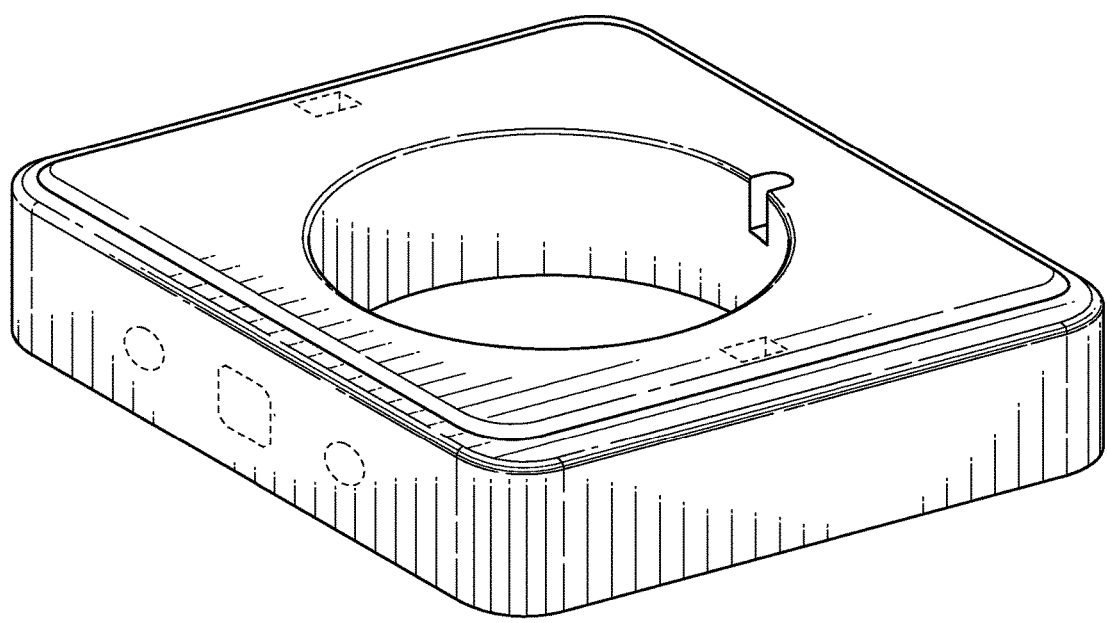
FIG. 48 is a perspective view of an embodiment of a base or support portion of a lamp of the invention.
Figure 49:
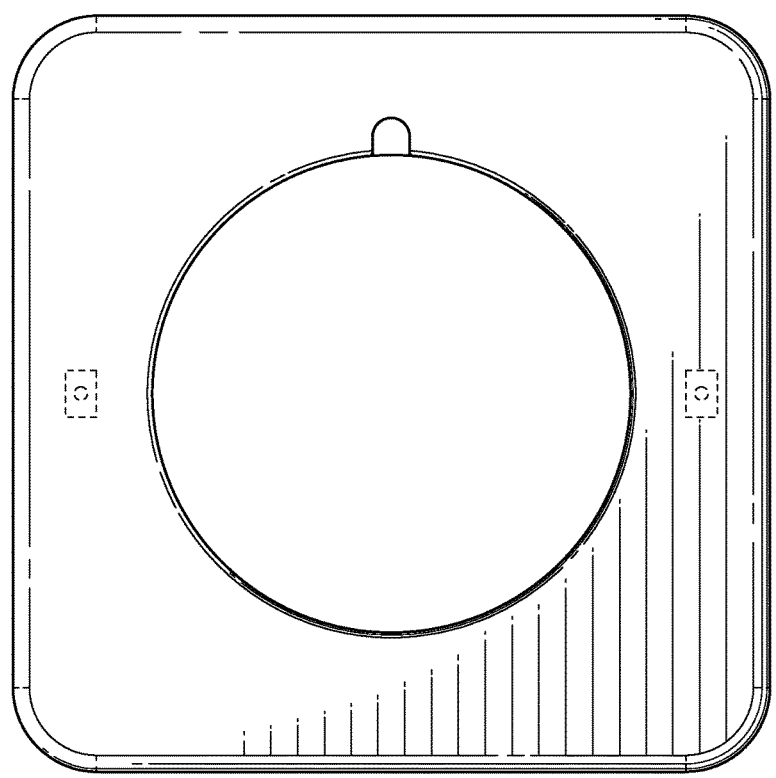
FIG. 49 is a top plan view of the embodiment of a base or support portion of a lamp of the invention illustrated in FIG. 48.
Figure 50:
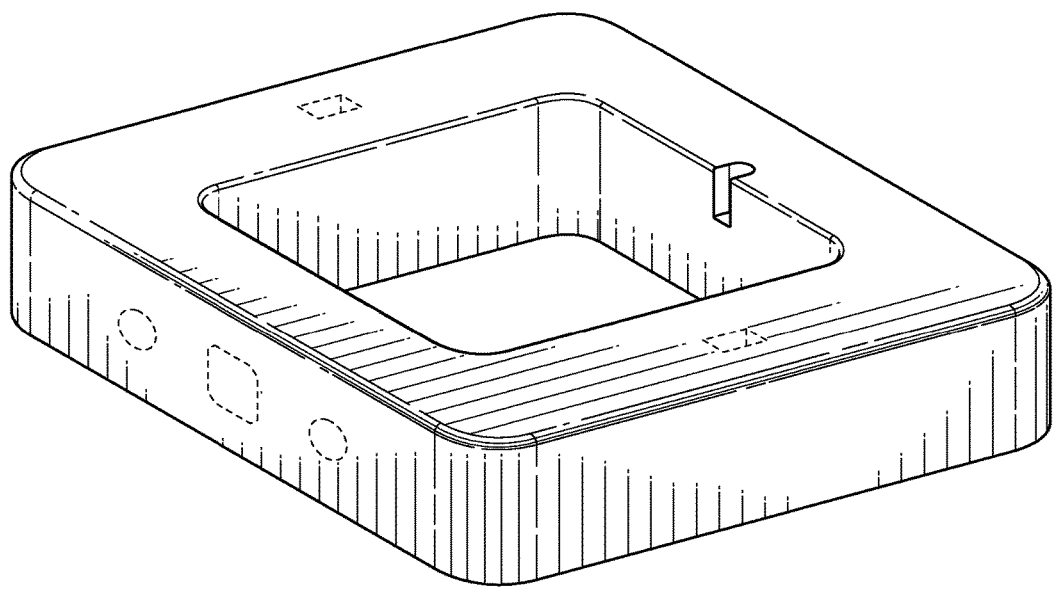
FIG. 50 is a perspective view of an embodiment of a base or support portion of a lamp of the invention.
Figure 51:
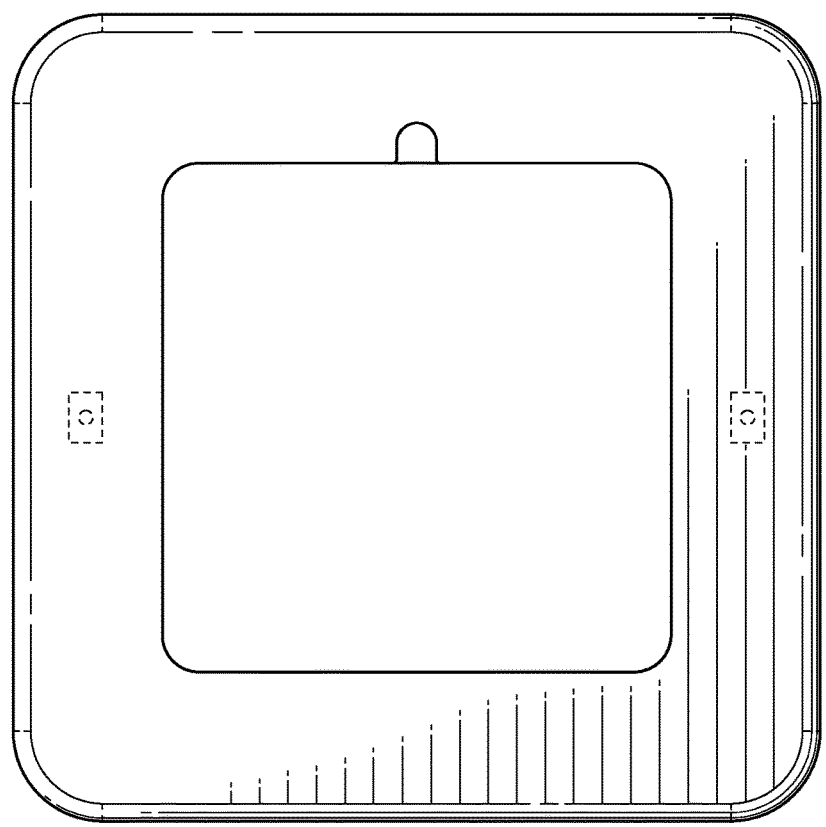
FIG. 51 is a top plan view of the embodiment of a base or support portion of a lamp of the invention illustrated in FIG. 50.
Figure 52:
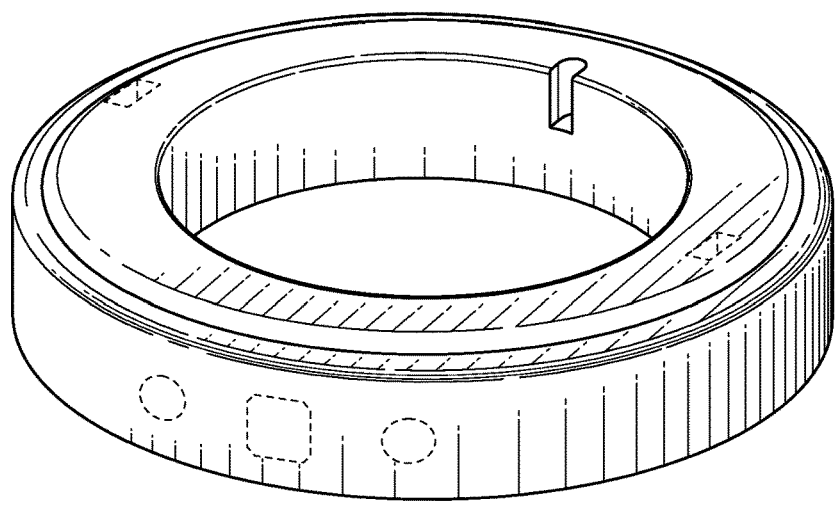
FIG. 52 is a perspective view of an embodiment of a base or support portion of a lamp of the invention.
Figure 53:
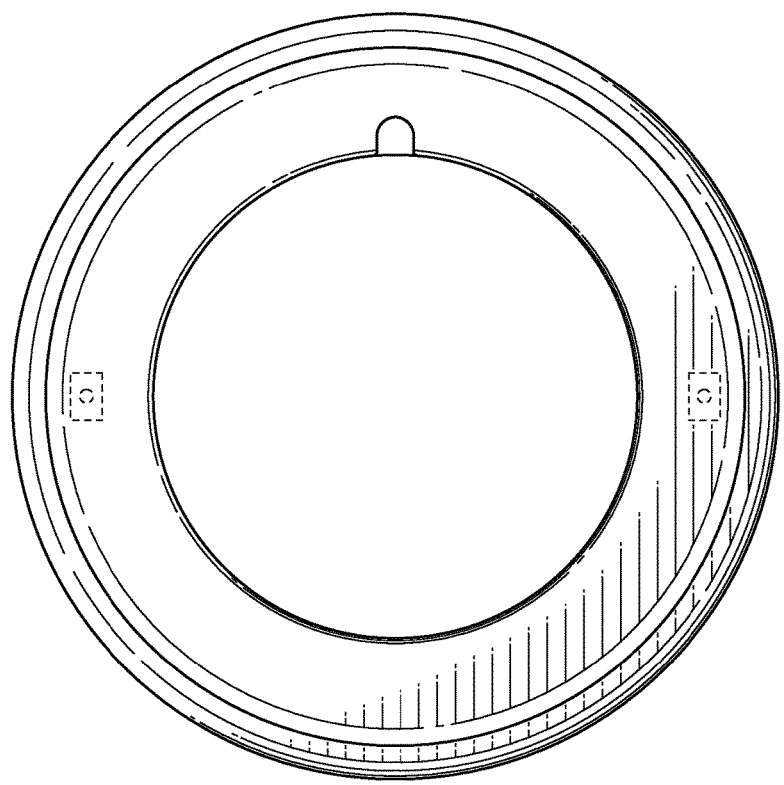
FIG. 53 is a view of the embodiment of a base or support portion of a lamp of the invention illustrated in FIG. 52.
Figure 54:
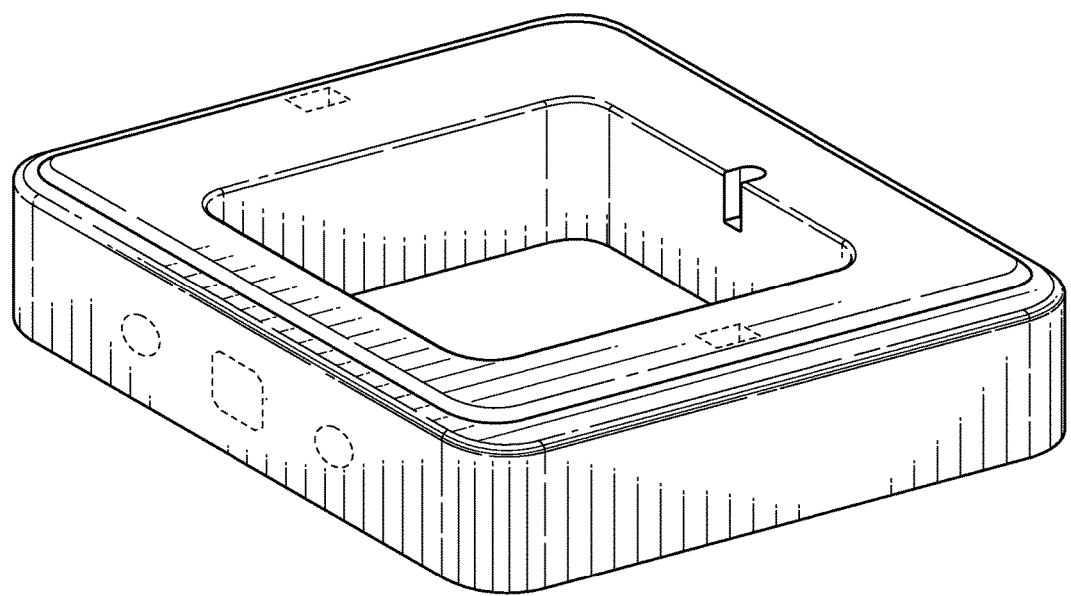
FIG. 54 is a perspective view of an embodiment of a base or support portion of a lamp of the invention.
Figure 55:
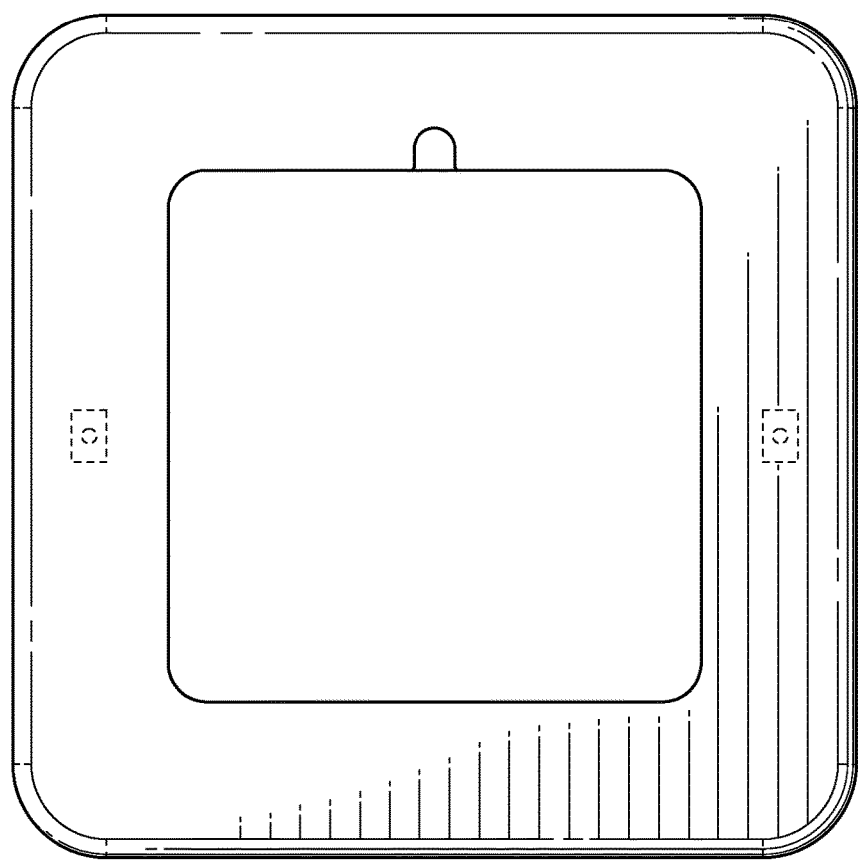
FIG. 55 is a top plan view of the embodiment of a base or support portion of a lamp of the invention illustrated in FIG. 54.
Figure 56:
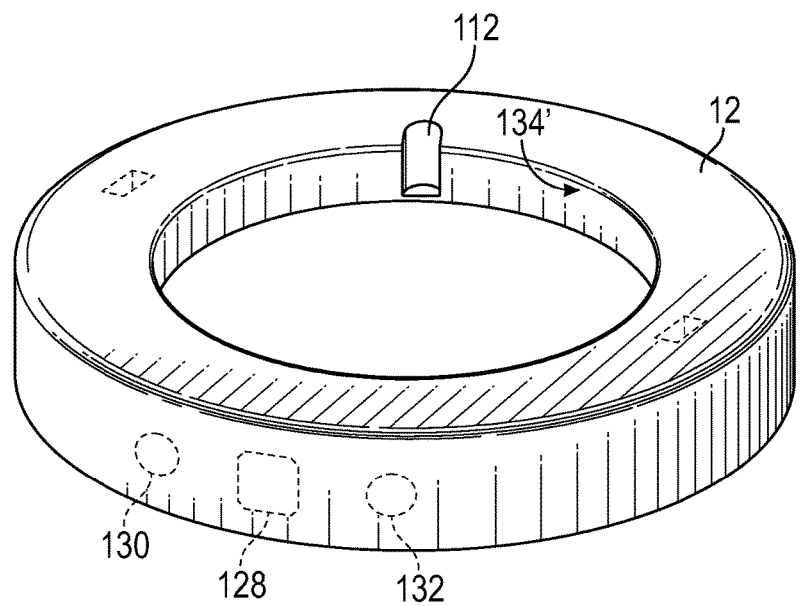
FIG. 56 is a perspective view of an embodiment of a base or support portion of a lamp of the invention.
Figure 57:
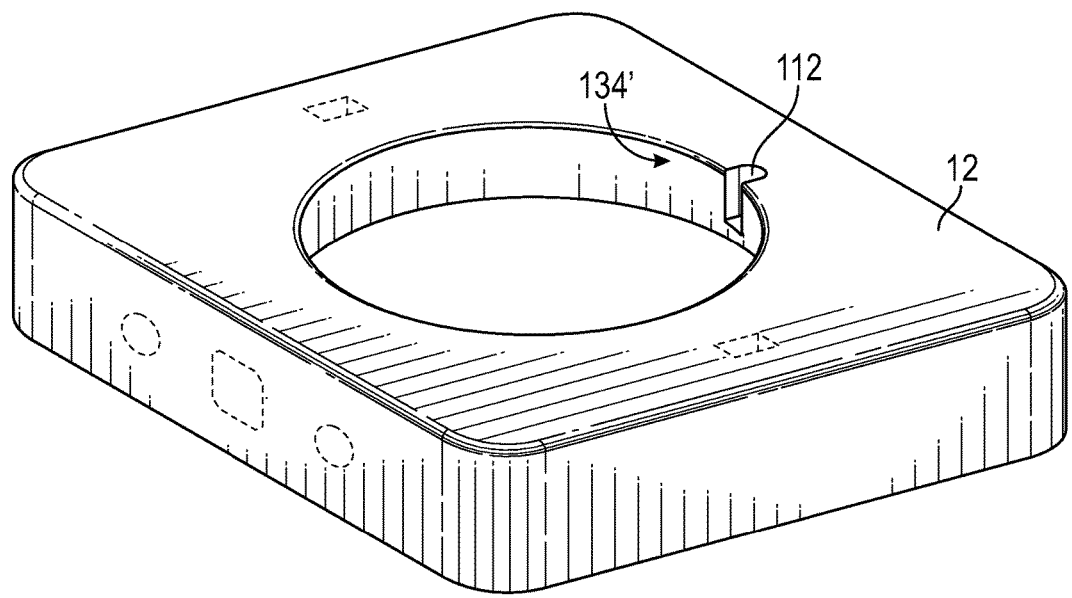
FIG. 57 is a perspective view of an embodiment of a base or support portion of a lamp of the invention.
Figure 58:
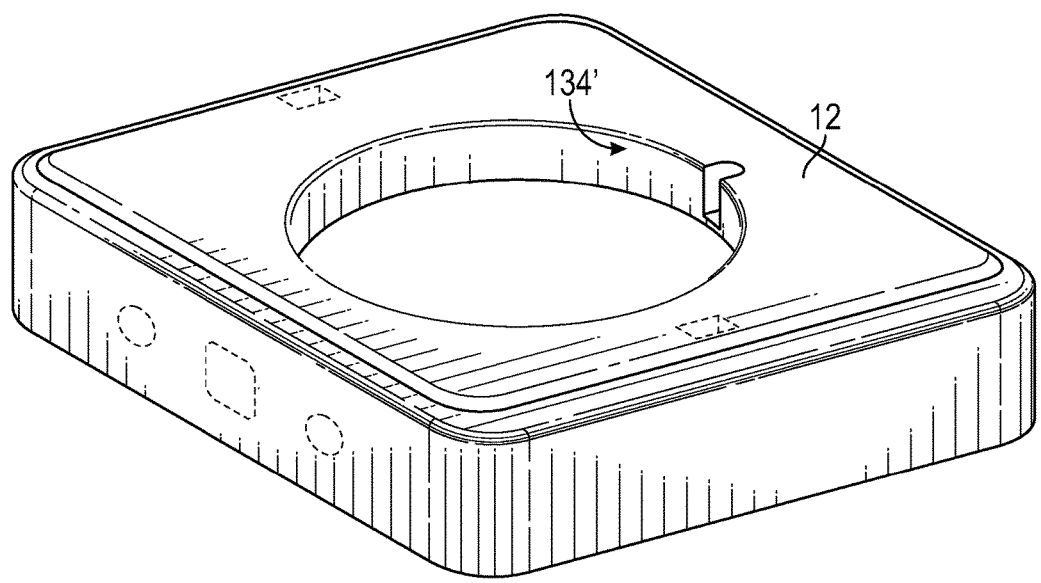
FIG. 58 is a perspective view of an embodiment of a base or support portion of a lamp of the invention.
Figure 59:
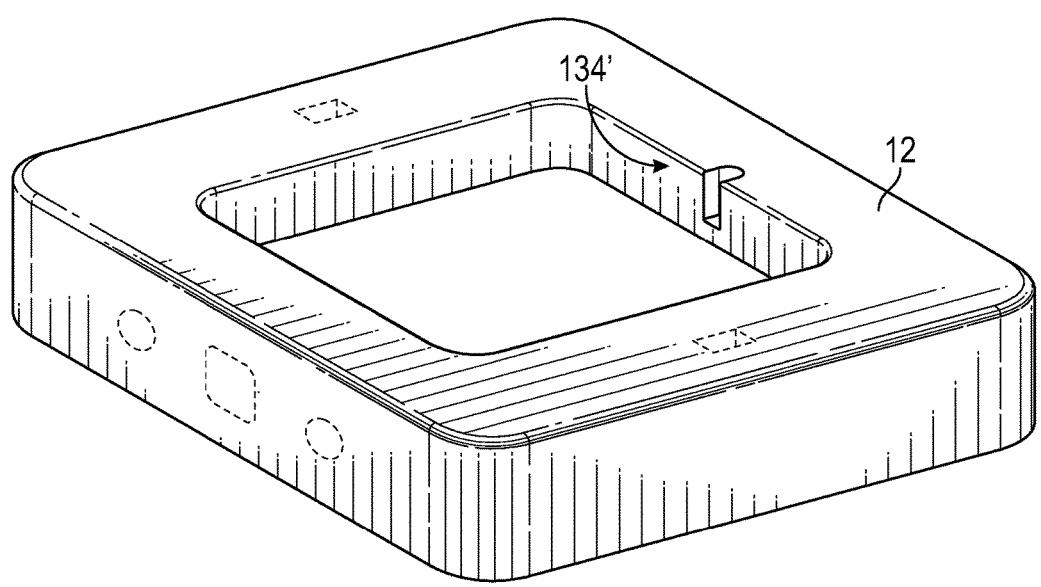
FIG. 59 is a perspective view of an embodiment of a base or support portion of a lamp of the invention.
Figure 60:
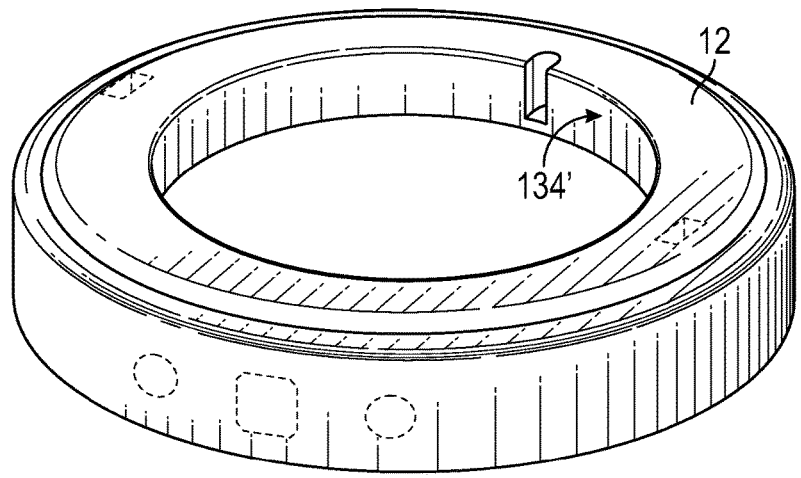
FIG. 60 is a perspective view of an embodiment of a base or support portion of a lamp of the invention.
Figure 61:
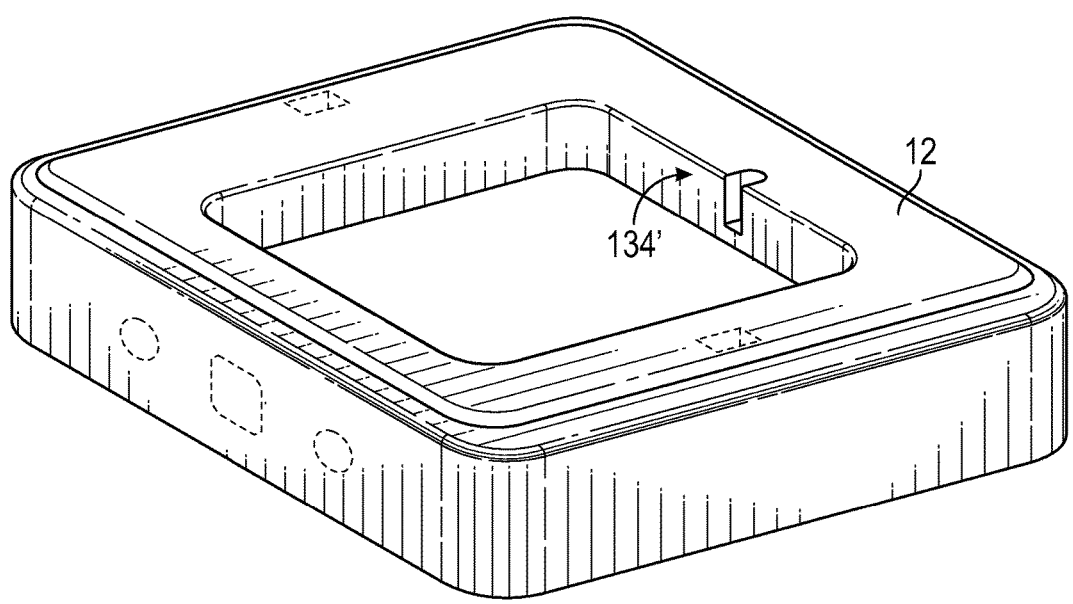
FIG. 61 is a perspective view of an embodiment of a base or support portion of a lamp of the invention.

FIG. 28L illustrates an embodiment in which, in dashed lines 126, the position and shape of the cavity and outlet 44 and USB port 113 are illustrated beneath the top surface of base 12.

FIGS. 29-61 illustrate various views of the base 12 and/or lamp 10 of the present invention. It should be understood that embodiments of base 12 may include a bottom frame portion beneath the cavity 30, may include a bottom portion that fully covers the bottom of cavity 30, or may include a bottom that covers only that portion of the base 12 that is not the cavity 30, such that the bottom of the cavity is a surface on which the base 12 rests.

Figure 62:
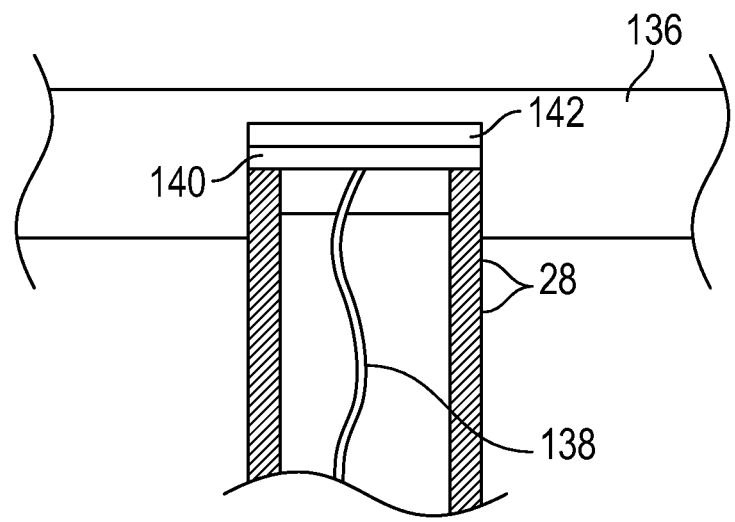
FIG. 62 is a partial cross-sectional view illustrating a base or support portion of a lamp of the present invention having a charging plate for charging mobile devices.

FIG. 62 illustrates a base 12 having an inductive charging pad 136. Charging pads (or plates or bases as they are sometimes called) for charging mobile devices by induction are well known. An example is the Belkin™ Boost Up Wireless Charging Pad. In embodiments, the charging pad 136 (including inductive charging circuitry) is incorporated into the top of the pedestal. A cord 138 for powering the charging pad 136 is electrically connected to the power chord 15 of the lamp 10, 68 and at least a portion of the cord 138 for powering the charging pad 136 is positioned inside pedestal post 28. A contact 140 comes in contact with a contact 142 on charging plate 136 to enable an electrical connection. Electrical contact connections are well known and a plurality of contact spaces or plugs may be employed for providing power to removable charging pad 136. In embodiments, excess cord for powering the charging pad is placed in slack in the post 28 and the cord includes a connector (not shown) for connecting one length of cord 28 to another length of cord 28. The charging pad 136 may be removed (such as in embodiments by removing fasteners and pulling upwardly or in embodiments by applying sufficient upward force on the charging pad to overcome frictional fit). When the charging pad 136 is pulled upwardly, the slack in the cord 138 of the charging pad 136 enables the charging pad to be spatially removed from the post and then disconnected by unplugging a segment of the cord of the charging pad).

Figure 63:
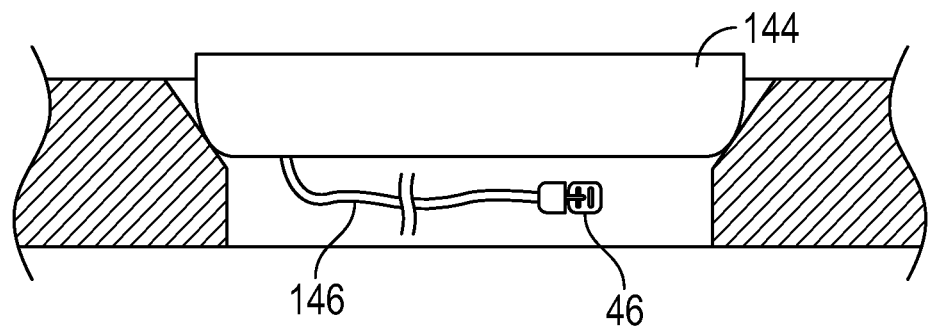
FIG. 63 is a side-elevational view of a base or support portion of a lamp of the invention.

With reference to FIG. 63, a wireless inductive charging pad 144, such as for example a Belkin™ Boost Up Wireless Charging Pad, having cord 146 plugged into outlet 46 is positioned in the opening in the base 12 of lamp 10/68. In this embodiment, the dimensions of the opening to cavity 30 and the dimensions of the upper and lower surfaces of charging pad 144, and the sloped side walls of the cavity 30 enable the charging pad 144 to nest at least partially in the base 12. In embodiments, the side walls of cavity 30 form a ledge, wherein the ledge is a flat ledge that protrudes outwardly at 90 degrees (or approximately so) from the side-wall of the cavity and on a separately manufactured inductive charging pad rests. As should be understood, each of the charging pad and the cavity of the lamp 10/68 may have vertical peripheral side walls such that the charging pad fits snugly into the cavity and rests on the ledge. In embodiments, the charging pad is secured into the cavity by fasteners, such as bolts or screws that pass through the base 12 and secure into the bottom of the charging pad, or by a bonding agent or adhesive. In embodiments, the separately manufactured charging pad is adhered to a tray that has structure for receiving fasteners and the tray with adhered charging plate is fastened to the base 12. Such embodiments are particularly useful to enable use of commercially available charging plates that are then secured to the lamp 10/68, such as to deter theft of the charging plate in hospitality environments such as hotel rooms. In embodiments, base 12 (or portions thereof), and/or peripheral side wall of the cavity 30, is/are over-molded or coated with rubber to create a gripping surface. In embodiments, the peripheral rim of the opening to cavity 30 has a rubber bead for creating a gripping surface for electronics products resting thereon or nested in the cavity 30.

From the foregoing it will be seen that this invention is one well adapted to attain all ends and objects hereinabove set forth together with the other advantages which are apparent and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

I claim:

1. An apparatus comprising:
a table-lamp or floor-lamp comprising—
a base;
a support extending upwardly from the base for supporting at least one light or lamp socket;
a cord connected to the apparatus and having a plug for plugging in to a power source;
an electrical outlet, positioned on said base, wherein said outlet is in electrical connection with said cord; and
wherein said base has a top having an opening to a cavity defined by said base, wherein said opening to said cavity has a dimension that enables a separately assembled electronic device that is placed on said top of said base to at least substantially cover said opening to said cavity, wherein a power cord of the electronic device is plugged into said outlet and the power cord of the electronic device is tucked into said cavity beneath said electronic device to at least substantially hide the power cord of the electronic device from sight.

2. The apparatus of claim 1, wherein said opening to said cavity has a cut-out portion that is not positioned beneath said electronic device when said electronic device is placed on said top of said lamp base, and wherein a portion of said power cord, of said electronic device, that is proximate to said electronic device extends out from said cavity through said cut-out.

3. The apparatus of claim 1, wherein said cavity comprises an upper portion and a lower portion, wherein said upper portion has a dimension across the upper portion of the cavity that is smaller than a corresponding dimension across said lower portion of the cavity.

4. The apparatus of claim 1, wherein said base has feet on a bottom side of the base to elevate the base slightly above a surface on which the apparatus sits, wherein said electrical outlet has receptacles for receiving a plug of said power cord of said electronic device, wherein said electrical outlet is positioned on said base such that said receptacles are accessible at an outer side-wall of said base and said plug of said power cord of said electronic device is located at a first end of said power cord of said electronic device and, wherein when said plug is plugged into said electrical outlet, said power cord of said electronic device is strung underneath said elevated base to position the power cord of the electronic device at least substantially in said cavity, wherein a second end of said power cord of said electronic device has a connector that is connected to said electronic device.

5. The apparatus of claim 1, wherein said electrical outlet has receptacles for receiving a plug of said power cord of said electronic device, wherein said electrical outlet is positioned on said base such that said receptacles are accessible at an outer side-wall of said base, and wherein said top of said base defines a cord-channel for receiving at least a portion of said power cord of said electronic device when said power cord of said electronic device is plugged into said electrical outlet.

6. The apparatus of claim 1, wherein said electrical outlet has receptacles for receiving a plug of said electronic device, wherein said electrical outlet is positioned on said base such that said receptacles are accessible at an outer side-wall of said base, wherein said side-wall of said base defines a cut-out and, when said power cord of said electronic device is plugged into said electrical outlet, said power cord of said electronic device is strung through said cut-out in said side wall of said base to position said power cord of said electronic device at least substantially in said cavity.

7. The apparatus of claim 1 wherein said electrical outlet comprises a first electrical outlet, said apparatus further comprising a second electrical outlet positioned on said base, said apparatus further comprising a removable bottom of said base, wherein said removable bottom has at least one light emitting device and wherein said removable bottom includes a plug for plugging into said second electrical outlet when said removable bottom is removably connected to said base.

8. The apparatus of claim 1, wherein said electrical outlet has receptacles for receiving a plug of said power cord of said electronic device, wherein said electrical outlet is positioned on said base such that said receptacles are accessible in said cavity at an inner side-wall of said base.

9. The apparatus of claim 8, wherein said receptacles of said electrical outlet are accessible at an inner side wall of said base that is at a front of said lamp such that said receptacle is not at least substantially visible when viewing the lamp from the front when said electronic device is not placed on said top of said lamp base.

10. The apparatus of claim 1, wherein said opening to said cavity has a dimension across the opening that is within the range of two to five inches.

11. The apparatus of claim 1 in combination with said electronic device, wherein said electronic device comprises a wireless speaker assembly.

12. The apparatus of claim 1 in combination with said electronic device, wherein said electronic device comprises an inductive charging plate.

13. An apparatus comprising:
a table-lamp or floor-lamp comprising—
a base;
a support extending upwardly from the base for supporting at least one light or lamp socket;
a cord connected to the apparatus and having a plug for plugging in to a power source;
an electrical outlet, positioned on said base, wherein said outlet is in electrical connection with said cord; and
wherein said base has a top having an opening to a cavity defined by said base;
wherein said base further comprises a pedestal for supporting an electronic device when said electronic device is placed on said lamp,
wherein said pedestal comprises a top and at least one post beneath said pedestal, wherein a power cord of the electronic device is plugged into said outlet and the power cord of the electronic device is placed into said cavity beneath said pedestal to at least substantially hide the power cord of the electronic device from sight.

14. The apparatus of claim 13, wherein said post comprises a telescoping post to enable said pedestal to be raised and lowered.

15. The apparatus of claim 13, wherein said power cord of said electronic device is at least partially wrapped around said pedestal.

16. The apparatus of claim 13, wherein said pedestal comprises a removable top.

17. The apparatus of claim 13, wherein said electrical outlet has receptacles for receiving a plug of said power cord of said electronic device, wherein said electrical outlet is positioned on said base such that said receptacles are accessible in said cavity at an inner side-wall of said base, wherein a bottom-side of a top of said pedestal has a cut-away portion for receiving a portion of a plug on said power cord of said electronic device.

18. The apparatus of claim 13, wherein said pedestal has a top that has a dimension to enable said top of said pedestal to fit snugly in said opening to said cavity.

19. The apparatus of claim 13, wherein said pedestal has a top that has a dimension to enable said top of said pedestal to fit in said opening to said cavity and define a gap between an outer periphery of said pedestal and said top of said base.

20. The apparatus of claim 19, further comprising at least one light device positioned in said cavity for emitting light through said gap.

21. The apparatus of claim 13, wherein said pedestal defines an area for wrapping said power cord of said electronic device.

22. The apparatus of claim 13, wherein said electrical outlet has receptacles for receiving a plug of said power cord of said electronic device, wherein said electrical outlet is positioned on said base such that said receptacles are accessible in said cavity at an inner side-wall of said base, wherein a bottom-side of a top of said pedestal has a cut-away portion for receiving a portion of a plug on said power cord of said electronic device.

23. The apparatus of claim 13, wherein said top of said pedestal comprises a wireless charging apparatus for charging a mobile device that is set on said top of said base.

* * * * *